(12) United States Patent
Dasgupta et al.

(10) Patent No.: US 11,145,861 B2
(45) Date of Patent: Oct. 12, 2021

(54) METHOD OF IMPROVED PERFORMANCE IN METAL ELECTRODES FOR BATTERIES

(71) Applicant: THE REGENTS OF THE UNIVERSITY OF MICHIGAN, Ann Arbor, MI (US)

(72) Inventors: Neil P. Dasgupta, Ann Arbor, MI (US); Kevin N. Wood, Ann Arbor, MI (US); Kuan-Hung Chen, Ann Arbor, MI (US); Eric Kazyak, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 67 days.

(21) Appl. No.: 16/094,123

(22) PCT Filed: Apr. 17, 2017

(86) PCT No.: PCT/US2017/027869
§ 371 (c)(1),
(2) Date: Oct. 16, 2018

(87) PCT Pub. No.: WO2017/184482
PCT Pub. Date: Oct. 26, 2017

(65) Prior Publication Data
US 2019/0131622 A1 May 2, 2019

Related U.S. Application Data

(60) Provisional application No. 62/326,118, filed on Apr. 22, 2016.

(51) Int. Cl.
*H01M 4/38* (2006.01)
*H01M 4/04* (2006.01)
(Continued)

(52) U.S. Cl.
CPC ......... *H01M 4/382* (2013.01); *H01M 4/0445* (2013.01); *H01M 4/134* (2013.01); *H01M 4/1395* (2013.01); *H01M 10/052* (2013.01)

(58) Field of Classification Search
CPC .. H01M 4/382; H01M 4/0445; H01M 10/052; H01M 4/1395; H01M 4/134
See application file for complete search history.

(56) References Cited

U.S. PATENT DOCUMENTS 3,923,550 A 12/1975 von Krusenstierna
8,846,248 B2 9/2014 Ryu et al.
(Continued)

FOREIGN PATENT DOCUMENTS

WO 2015074006 A1 5/2015
WO 2015164592 A1 10/2015

OTHER PUBLICATIONS

Hao et al. "Temperature-Adaptive Alternating Current Preheating of Lithium-Ion Batteries with Lithium Deposition Prevention." Journal of the Electrochemical Society 163 (2) A290-A299 (2016) (Year: 2016).*

(Continued)

*Primary Examiner* — Michael L Dignan
(74) *Attorney, Agent, or Firm* — Quarles & Brady LLP

(57) ABSTRACT

Disclosed are methods for pre-conditioning or pre-treating the surface of a metal (e.g., lithium) electrode such that the cycle life and efficiency of the electrode within an electrochemical cell are improved through the prevention of dendrite growth. The pretreatment process includes the use of an alternating current to modify the surface properties of the metal electrode, such that a more uniform flux of metal ions is transferred across the electrode-electrolyte Interface in subsequent electrodeposition and electrodissolution processes. As a result, an electrode treated with such a process exhibits improved performance and durability, including (Continued)

markedly lower overpotentials and largely improved metal (e.g., lithium) retention in strip plate tests as compared with untreated electrodes.

77 Claims, 20 Drawing Sheets

(51) Int. Cl.
  *H01M 10/052* (2010.01)
  *H01M 4/1395* (2010.01)
  *H01M 4/134* (2010.01)

(56) References Cited

U.S. PATENT DOCUMENTS

| | | | |
|---|---|---|---|
| 2006/0063073 A1* | 3/2006 | Kawashima | H01M 4/13 429/246 |
| 2011/0053001 A1 | 3/2011 | Babic et al. | |
| 2011/0224578 A1 | 9/2011 | Edman et al. | |
| 2012/0047725 A1 | 3/2012 | Gschweitl et al. | |
| 2012/0107698 A1 | 5/2012 | Muldoon et al. | |
| 2014/0084849 A1* | 3/2014 | Lee | H02J 7/008 320/107 |
| 2014/0197802 A1* | 7/2014 | Yamazaki | H01M 10/4235 320/137 |
| 2015/0056484 A1 | 2/2015 | Lee et al. | |
| 2015/0311565 A1 | 10/2015 | Muldoon et al. | |
| 2016/0013462 A1 | 1/2016 | Cui et al. | |
| 2016/0093884 A1 | 3/2016 | Cui et al. | |
| 2016/0204470 A1 | 7/2016 | Mohtadi | |
| 2016/0308248 A1 | 10/2016 | Burrell et al. | |
| 2017/0179546 A1* | 6/2017 | Castaneda | H02J 7/00 |
| 2018/0131045 A1* | 5/2018 | Antonopoulos | H01M 10/52 |
| 2018/0131046 A1* | 5/2018 | Stock | H01M 10/058 |

OTHER PUBLICATIONS

Hao et al. "Internal heating of lithium-ion batteries using alternating current based on the heat generation model in frequency domain." Journal of Power Sources 273 (2015) 1030-1037 (Year: 2015).*
Li et al. "Understanding the molecular mechanism of pulse current charging for stable lithium-metal batteries." Sci. Adv. 2017, 3: e1701246 (Year: 2017).*
International Search Report and Writte Opinion issued in corresponding International Application No. PCT/US2017/027869, dated Jun. 26, 2017, 8 pages.
Agubra et al. "Lithium Ion Battery Anode Aging Mechanisms" Materials 2013, 6, pp. 1310-1325 | doi:10.3390/ma6041310; ISSN 1996-1944.
Aryanfar et al. "Dynamics of Lithium Dendrite Growth and Inhibition—Pulse Charging Experiments and Monte Carlo Calculations" Linde Center for Global Environmental Science, Materials and Process Simulation Center, California Institute of Technology, California 91125, U.S.A, Journal of Physical Chemistry Letters • May 2014, 1721-1726.
Assary, R. S.; Curtiss, L. A.; Moore, J. S.; "Toward a Molecular Understanding of Energetics in Li—S Batteries Using Nonaqueous Electrolytes: A High-Level Quantum Chemical Study" J. Phys. Chem. C 2014, 118 (22), 11545-11558.
Aurbach, D.; Zinigrad, E. Teller, H.; Dan, P.; "Factors Which Limit the Cycle Life of Rechargeable Lithium (Metal) Batteries" J. Electrochem. Soc. 2000, 147 (4), 1274-1279.
Aurbach, D. et al.; "A short review of failure mechanisms of lithium metal and lithiated graphite anodes in liquid electrolyte solutions" Solid State Ionics 2002, 148 (3-4), 405-416.
Bieker, G.; Bieker, P. M.; Winter, M.; "Electrochemical in situ investigations of SEI and dendrite formation on the lithium metal anode" Phys. Chem. Chem. Phys. 2015, 17, 8670-8679 | DOI: 10.1039/C4CP05865H.

Choi, J. W.; Aurbach, D.; "Promise and reality of post-lithium-ion batteries with high energy densities" Nat. Rev. Mater. 2016, 1 (4), 16013.
Choudhury et al. "A highly reversible room-temperature lithium metal battery based on crosslinked hairy nanoparticles" Nature Communications, pp. 1-9 | DOI: 10.1038/ncomms10101.
Gallagher, K. G.; Goebel, S.; Greszler, T.; Mathias, M.; Oelerich, W; Eroglu, D.; Srinivasan, V.; "Quantifying the promise of lithium-air batteries for electric vehicles" Energy Environ. Sci. 2014, 7 (5), 1555-1563.
Han et al. "Over-limiting Current and Control of Dendritic Growth by Surface Conduction in Nanopores" Scientific Reports, pp. 1-8 | 4 : 7056 | DOI: 10.1038/srep07056.
Kazyak, E.; Wood, K. N.; Dasgupta, N. P.; "Improved Cycle Life and Stability of Lithium Metal Anodes through Ultrathin Atomic Layer Deposition Surface Treatments" Chem. Mater. 2015, 27 (18), 6457-6462.
Kozen, A. C.; Lin, C.-F.; Pearse, A. J.; Schroeder, M. A.; Han, X.; Hu, L.; Lee, S.-B.; Rubloff, G. W.; Noked, M.; "Next-Generation Lithium Metal Anode Engineering via Atomic Layer Deposition" ACS Nano 2015, 9 (6), 5884-5892.
Li, W.; Yao, H.; Yan, K.; Zheng, G.; Liang, Z.; Chiang, Y.-M.; Cui, Y.; "The synergetic effect of lithium polysulfide and lithium nitrate to prevent lithium dendrite growth" Nat. Commun. 2015, 6 (May), 7436, pp. 1-8.
Liang, Z.; Lin, D.; Zhao, J.; Lu, Z.; Liu, Y.; Liu, C.; Lu, Y.; Wang, H.; Yan, K.; Tao, X.; Cui, Y.; "Composite lithium metal anode by melt infusion of lithium into a 3D conducting scaffold with lithiophilic coating" Proc. Natl. Acad. Sci. 2016, 201518188.
Lin, D.; Liu, Y.; Liang, Z.; Lee, H.-W.; Sun, J.; Wang, H.; Yan, K.; Xie, J.; Cui, Y.; "Layered reduced graphene oxide with nanoscale interlayer gaps as a stable host for lithium metal anodes" Nature Nanotechnology | vol. 11 | Jul. 2016, 626-632.
Liu, Y.- Lin, D.- Liang, Z.; Zhao, J.- Yan, K.; Cui, Y.- "Lithium-coated polymeric matrix as a minimum volume-change and dendrite-free lithium metal anode" Nat. Commun. 2016, 7, 10992, pp. 1-9.
McDowall "Understanding Lithium-Ion Technology" Saft America Inc., pp. 9-1-9-10, (2008).
Mehdi, B. L.; Qian, J.; Nasybulin, E.; Park, C.; Welch, D. A.; Faller, R.; Mehta, H.; Henderson, W. a.; Xu, W.; Wang, C. M.; Evans, J. E.; Liu, J.; Zhang, J.-G.; Mueller, K. T.; Browning, N. D.; "Observation and Quantification of Nanoscale Processes in Lithium Batteries by Operando Electrochemical (S)TEM" Nano Lett. 2015, 15, 2168-2173.
Nitta et al. "Li-ion battery materials: present and future" Materials Today, vol. 18, No. 5, Jun. 2015, pp. 252-264.
Park et al. "A Highly Reversible Lithium Metal Anode" Scientific Reports, 2014, pp. 1-8 | 4 : 3815 | DOI: 10.1038/srep03815.
Park, J.; Jeong, J.; Lee, Y.; Oh, M.; Ryou, M.-H.; Lee, Y. M.; "Micro-Patterned Lithium Metal Anodes with Suppressed Dendrite Formation for Post Lithium-Ion Batteries" Adv. Mater Interfaces 2016, 1.
Peled, E.; "Film forming reaction at the lithium/electrolyte interface" J. Power Sources 1983, 9 (3), pp. 253-266.
Peled, E.; "The Electrochemical Behavior of Alkali and Alkaline Earth Metals in Nonaqueous Battery Systems—The Solid Electrolyte Interphase Model" J. Electrochem. Soc. 1979, 126 (12), pp. 2047-2051.
Qian, J.; Henderson, W. a.; Xu, W.; Bhattacharya, P.; Engelhard, M.; Borodin, O.; Zhang, J.-G.; "High rate and stable cycling of lithium metal anode" Nat. Commun. 2015, 6, 6362, pp. 1-9.
Seh et al. "A Highly Reversible Room-Temperature Sodium Metal Anode" ACS Central Science 2015, 1, pp. 449-455 DOI: 10.1021/acscentsci.5b00328.
Sun, F.; Wang, J.; Long, D.; Qiao, W.; Ling, L; Lv, C.; Cai, R.; "A high-rate lithium-sulfur battery assisted by nitrogen-anriched mesoporous carbons decorated with ultrafine La2O3 nanoparticles" J. Mater. Chem. A 2013, 1 (42), 13283-13289.
Whittingham, M. S., "Electrical Energy Storage and Intercalation Chemistry" Science (80-. ). 1976, 192 (4244), 1126-1127.
Wood, K. N.; Eric Kazyak; Chadwick, A. F.; Chen, K. H.; Zhang, J.-G.; Thornton, K.; Dasgupta, N. P.; "Dendrites and Pits: Untangling the Complex Behavior of Lithium Metal Anodes through

(56) References Cited

OTHER PUBLICATIONS

Operando Video Microscopy" ACS Cent. Sci. 2016, 2, 790-801 | DOI: 10.1021/acscentsci.6b00260.

Xu et al. "Lithium metal anodes for rechargeable batteries" The Royal Society of Chemistry 2014, Energy & Environmental Science, 2014, 7, pp. 513-537.

Zheng G.; Lee, S. W.; Liang, Z.; Lee, H.-W.; Yan, K.; Yao, H.; Wang, H.; Li, W.; Chu, S.; Cui, Y.; "Interconnected hollow carbon nanospheres for stable lithium metal anodes" Nat. Nanotechnol. 2014, 9 (8), 618-623.

Zimmerman et al. "Lithium Plating in Lithium-Ion Cells" The Aerospace Corporation 2010, Presented at the NASA Battery Workshop, Nov. 16-18, 2010, Huntsville, AL, 19 pages.

Aryanfar et al. "Supporting Information for Dynamics of Lithium Dendrite Growth and Inhibition—Pulse Charging Experiments and Monte Carlo Calculations" Linde Center for Global Environmental Science, Materials and Process Simulation Center, California Institute of Technology, California 91125, U.S.A., 6 pages.

\* cited by examiner

METHOD OF IMPROVED PERFORMANCE IN METAL ELECTRODES FOR BATTERIES

CROSS-REFERENCE TO RELATED APPLICATIONS

This application represents the national stage entry of PCT International Application No. PCT/US2017/027869 filed Apr. 17, 2017, which claims priority to U.S. Patent Application No. 62/326,118 filed Apr. 22, 2016, the contents of which are hereby incorporated herein by reference for all purposes.

STATEMENT REGARDING FEDERALLY SPONSORED RESEARCH

This invention was made with government support under DE-AC02-06CH11357 awarded by the Department of Energy. The government has certain rights in the invention.

BACKGROUND OF THE INVENTION

1. Field of the Invention

This invention relates to electrochemical devices, such as batteries containing a metal anode. This invention also relates to methods for treating electrodes of such electrochemical devices. More particularly, the invention relates to a method for treating a lithium metal electrode with an alternating current to modify the surface properties of the lithium metal, such that a more uniform flux of lithium ions is transferred across the electrode-electrolyte interface in subsequent electrodeposition and electrodissolution processes. As a result, an electrode treated with such a process exhibits improved performance and durability.

2. Description of the Related Art

Lithium ion (Li-ion) battery technology has advanced significantly and has a market size projected to be $10.5 billion by 2019. Current state-of-the-art Li-ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

Batteries with longer lives, higher capacities, and reduced safety concerns are needed for many applications including electric vehicles, grid storage, and consumer electronics. For many years, lithium (Li) metal has been considered the "ideal" anode material because of its ability to store lightweight Li in the metallic form without the need for an inactive host material or a conductive scaffold. This provides a capacity of 3860 mAh/g and the lowest theoretical anode potential, making it an enabling technology for next-generation battery systems including Li-sulfur and Li-air. Unfortunately, reactivity issues resulting from electrode-electrolyte interactions prevent extended cycling of lithium metal. These interactions lead to the formation of erratic dendritic structures that cause a reduction in Coulombic efficiency and eventual failure. These types of failure not only may shorten battery life but may also cause safety hazards as a result of gas evolution and possible ignition of the flammable electrolyte.

A natural solid electrolyte interphase (SEI) is known to form as a result of lithium metal interacting with the electrolyte. This layer acts as an ionic conductor and electronic insulator and evolves to form a complex, multilayer surface coating. However, as metallic lithium is plated or stripped, uneven current distributions resulting from surface inhomogeneities lead to localized "hot spots" where lithium preferentially nucleates, resulting in the fracture of the SEI layer due to localized stresses. This exposes the underlying lithium metal leading to dendrite growth and further deleterious and potentially dangerous side reactions. The effect of these reactions is threefold: (1) dendrite growth may lead to short-circuiting, (2) rapid consumption of the electrolyte may cause high overpotentials and thick SEI layers that consume previously active lithium and may lead to cell failure due to insufficient electrolyte, and (3) inactive or "dead" lithium which forms as dendrites may become electrically isolated from the bulk electrode, leading to capacity fade of the cell over time. Unfortunately, dendrite growth is a positive feedback phenomenon such that, as cycling proceeds, deposition will preferentially occur on existing dendrites, thus exacerbating the problem.

Therefore, what is needed is a method to improve the interface between the lithium metal electrode and electrolyte that results in enhanced cell life cycle and efficiency.

SUMMARY OF THE INVENTION

This disclosure provides a method for pre-conditioning the surface of a metallic electrode such that the cycle life and efficiency in an electrochemical cell are improved. This formation process includes the use of alternating current to modify the surface properties of the metal (e.g., lithium, magnesium, sodium, zinc), such that a more uniform flux of metal ions is transferred across the electrode-electrolyte interface in subsequent electrodeposition and electrodissolution processes. As a result, an electrode treated with such a process exhibits improved performance and durability.

This disclosure may be applied in a formation process for batteries that use metal (e.g., lithium, magnesium, sodium, zinc) electrodes. Further, the present invention may provide a break-in procedure for any device or process requiring a metal electrode. The application of the process of the current invention to an electrode may advantageously improve cell lifetime and efficiency for an electrochemical cell in which the electrode is placed.

In one aspect, the invention provides a method for treating a metal electrode. The method can include the steps of: (a) connecting an alternating current source to the metal electrode; and (b) subjecting the metal electrode to an alternating current perturbation, while in contact with an electrolyte, for a treatment time. Step (b) in this method for treating a metal electrode may comprise subjecting the metal electrode to the alternating current perturbation for the treatment time in a liquid electrolyte comprising a lithium compound in an organic solvent. Step (b) in this method for treating a metal electrode may comprise subjecting the metal electrode to the alternating current perturbation for the treatment time in a liquid electrolyte comprising a magnesium compound in an organic solvent. The metal electrode may comprise a metal selected from the group consisting of lithium, magnesium, sodium, and zinc. The metal electrode may comprise lithium. The metal electrode may comprise magnesium. The alternating current perturbation can have an amplitude between about 0.05 V and 1.0 V, or between about 0.3 V and 0.7 V, or about 0.5 V. The treatment time can be between about 1 minute and 5 hours, or between about 1 minute and 1 hour, or about 2 minutes. The alternating current perturbation can have a current density amplitude between about 0.05 mA/cm$^2$ and about 20 mA/cm$^2$. The metal electrode can be pretreated with a solvent before subjecting the metal electrode to the alternating current perturbation. The solvent may comprise an alkane.

In another aspect, the invention provides a method for making an electrochemical cell. The method can include the steps of: (a) assembling a metal electrode into a full electrochemical cell; (b) connecting the electrochemical cell to a voltage controlled alternating current source; and (c) treating just the metal electrode by subjecting the electrochemical cell to an alternating current perturbation for a treatment time. Upon cycling of the electrochemical cell, dendrites on the electrode are smaller and more uniform compared to a similar electrochemical cell in which a metal electrode of the similar electrochemical cell was not subjected to an alternating current perturbation. Step (c) of this method for making an electrochemical cell can be initiated before or after a solid electrolyte interphase is present on the electrode. Step (c) of this method for making an electrochemical cell can comprise a first charge of the electrochemical cell. Step (c) of this method for making an electrochemical cell can comprise applying the alternating current perturbation after a discharge of the cell. Step (c) of this method for making an electrochemical cell can comprise applying a one-time alternating current perturbation. Step (c) of this method for making an electrochemical cell can comprise applying the alternating current perturbation after every charge/discharge cycle of the cell. Step (c) of this method for making an electrochemical cell can comprise applying the alternating current perturbation to the electrode for a treatment time without a simultaneous or switching application of a direct current. The alternating current perturbation can have a voltage amplitude less than a full discharge voltage of the electrochemical cell thereby treating just the metal electrode. The alternating current perturbation can have an amplitude between about 0.05 V and 1.0 V, or between about 0.3 V and 0.7 V, or about 0.5 V. The treatment time can be between about 1 minute and 5 hours, or between about 1 minute and 1 hour. The alternating current perturbation can have a current density amplitude between about 0.05 mA/cm$^2$ and about 20 mA/cm$^2$. The treated metal electrode can be an anode and/or a cathode of the electrochemical cell. The electrochemical cell can include a lithium metal anode and a cathode comprising a lithium host material. The electrochemical cell can include a lithium metal anode and a cathode comprising sulfur. The electrochemical cell can include a lithium metal anode and a cathode comprising an air electrode. The electrochemical cell can include a liquid electrolyte. The electrochemical cell can include a solid electrolyte material.

In yet another aspect, the invention provides a method for making an electrochemical cell. The method can include the steps of: (a) assembling a metal electrode into a full electrochemical cell; (b) connecting the electrochemical cell to a current controlled alternating current source; and (c) treating one or both of an anode and a cathode of the electrochemical cell by subjecting the electrochemical cell to an alternating current perturbation for a treatment time. Upon cycling of the electrochemical cell, dendrites on the electrode are smaller and more uniform compared to a similar electrochemical cell in which a metal electrode of the similar electrochemical cell was not subjected to an alternating current perturbation. Step (c) of this method for making an electrochemical cell can be initiated before or after a solid electrolyte interphase is present on the electrode. Step (c) of this method for making an electrochemical cell can comprise a first charge of the electrochemical cell. Step (c) of this method for making an electrochemical cell can comprise applying the alternating current perturbation after a discharge of the cell. Step (c) of this method for making an electrochemical cell can comprise applying a one-time alternating current perturbation. Step (c) of this method for making an electrochemical cell can comprise applying the alternating current perturbation after every charge/discharge cycle of the cell. Step (c) of this method for making an electrochemical cell can comprise applying the alternating current perturbation to the electrode for a treatment time without a simultaneous or switching application of a direct current. The alternating current perturbation can have a voltage amplitude less than a full discharge voltage of the electrochemical cell thereby treating just the metal electrode. The alternating current perturbation can have an amplitude between about 0.05 V and 1.0 V, or between about 0.3 V and 0.7 V, or about 0.5 V. The treatment time can be between about 1 minute and 5 hours, or between about 1 minute and 1 hour. The alternating current perturbation can have a current density amplitude between about 0.05 mA/cm$^2$ and about 20 mA/cm$^2$. The treated metal electrode can be an anode and/or a cathode of the electrochemical cell. The electrochemical cell can include a lithium metal anode and a cathode comprising a lithium host material. The electrochemical cell can include a lithium metal anode and a cathode comprising sulfur. The electrochemical cell can include a lithium metal anode and a cathode comprising an air electrode. The electrochemical cell can include a liquid electrolyte. The electrochemical cell can include a solid electrolyte material.

Some of the advantages of the present disclosure are the quickness of the process and the easy setup requiring little or no extra equipment and cost. Additionally, the process may be utilized on a variety of battery chemistries and even optimized for each specific electrode.

These and other features, aspects, and advantages of the present invention will become better understood upon consideration of the following detailed description, drawings, and appended claims.

DETAILED DESCRIPTION OF THE INVENTION

The present invention provides new methods for pretreating a metal (e.g., lithium) electrode with an alternating current (AC) source. The process includes applying a periodic perturbation to the cell such that either voltage or current is controlled for a given duration of time. This method may also include the use of a frequency response technique, such as electrochemical impedance spectroscopy (EIS), to determine the optimal frequency range for the applied perturbation.

Without being bound by theory, it is hypothesized that the perturbation treatment with an AC source creates changes in the chemical reactivity of the electrode. These changes allow a more homogenous flux of metal ions to flow across the interface between the electrode and the electrolyte. Specifically, it is believed that the alternating current disrupts the uneven or inhomogeneous solid electrolyte interphase (SEI) on the electrode. Applying this treatment to the electrodes may change the nature of the SEI, which would otherwise form due to the uncontrolled reaction of the electrolyte solution with the metal surface of the electrode. Further, without this AC pretreatment, large acicular crystals or arborescent shapes, or dendrites, may form during the deposition and dissolution of metal (e.g., lithium) between the electrodes. Thus, the initial AC perturbation of the surface environment between the electrode and the electrolyte solution may prevent inhomogeneous dendrite growth on the electrode surface during charging or discharging.

The perturbation treatment may be combined with other pretreatments to the metal (e.g., lithium, magnesium, sodium, zinc) surface before performing the AC treatment, including chemical pretreatments. For example, a pentane solvent cleaning may be applied to the metal surface of the electrode in an inert argon glovebox environment in order to improve the results of the AC perturbation treatment.

Figure 1A:
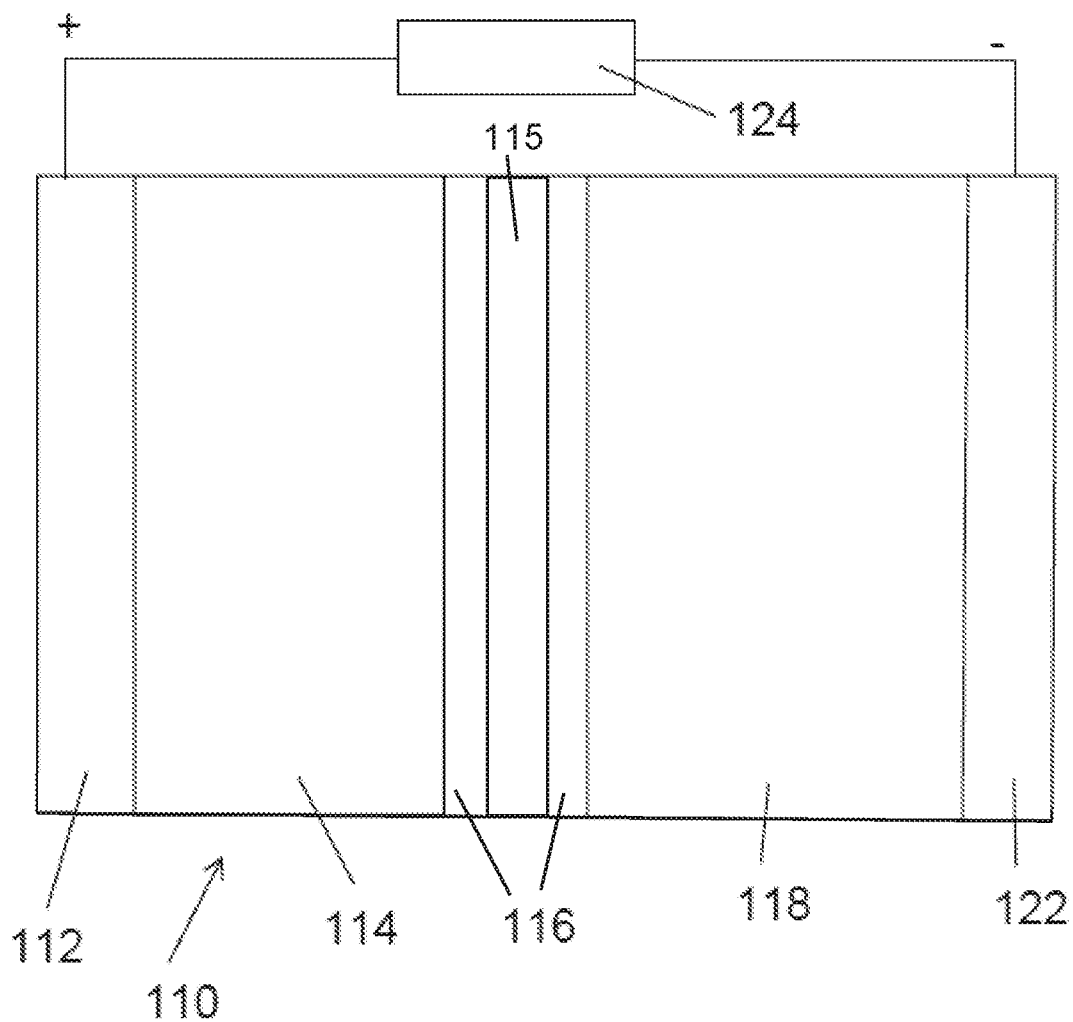
FIG. 1A is a schematic of a lithium metal battery.

In a non-limiting example version of the invention, a lithium metal battery as depicted in FIG. 1A is treated. The lithium metal battery 110 of FIG. 1A includes a current collector 112 in contact with a cathode 114. At least a portion of an amount of a liquid electrolyte 116 is arranged between the cathode 114 and an anode 118, which is in contact with a current collector 122. A separator 115 keeps the cathode 114 and the anode 118 from touching but allows Li⁺ ions through. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery.

A suitable active material for the cathode 114 of the lithium metal battery 110 is one or more of the lithium host materials, or porous carbon (for a lithium air battery), or a sulfur containing material (for a lithium sulfur battery). The lithium host materials may be selected from lithium metal oxides wherein the metal is one or more of aluminum, cobalt, iron, manganese, nickel, vanadium, lithium-containing phosphates having a general formula $LiMPO_4$ wherein M is one or more of cobalt, iron, manganese, and nickel. In one embodiment, the lithium host material is selected from lithium cobalt oxide, lithium nickel manganese cobalt oxide, and lithium manganese oxide.

A suitable active material for the anode 118 of the lithium metal battery 110 is lithium metal. However, other batteries suitable for use in the method of the invention include a metal electrode comprising a metal selected from magnesium, sodium, and zinc.

An example electrolyte 116 of the lithium metal battery 110 comprises a lithium compound in an organic solvent. The lithium compound may be selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and the ether based solvent may be selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

During normal operation, the principal functions of the separator 115 are to prevent electronic conduction (i.e., shorts or direct contact) between the anode and cathode while permitting ionic conduction via the electrolyte. A suitable material for the separator 115 of the lithium metal battery 110 is porous polypropylene, porous polyethylene, or blends or layers thereof.

Alternatively, the separator 115 and the liquid electrolyte 116 of the battery 110 may be replaced with a solid electrolyte material. In non-limiting example solid electrolyte materials, the solid electrolyte material comprises a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

In another non-limiting example version of the invention, a magnesium metal battery is treated. In the magnesium metal battery, the anode may include magnesium metal. The cathode may include various materials that show an electrochemical reaction at a higher electrode potential than the anode. Examples of cathode materials include transition metal oxides. In the magnesium metal battery, magnesium cations are reversibly stripped and deposited between the anode and cathode. In the magnesium metal battery, the electrolyte may be a liquid electrolyte comprising a magnesium compound in an organic solvent. The magnesium compound may be selected from $Mg(B_xH_y)_z$ wherein x=3-12, y=8-12 and z=1-2; $Mg(BX_4)_2$ wherein X is selected from H, F and O-alkyl; $Mg[B(C_2O_4)_2]_2$; $Mg[BF_2(C_2O_4)]_2$; $Mg(ClO_4)_2$; $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_3)_2)_2$; $Mg(N(SO_2CF_2CF_3)_2)_2$; $Mg(N(SO_2C_2F_5)_2)_2$; $Mg(BF_3C_2F_5)_2$; and $Mg(PF_3(CF_2CF_3)_3)_2$. The organic solvent may be an ether based solvent selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

Figure 1B:
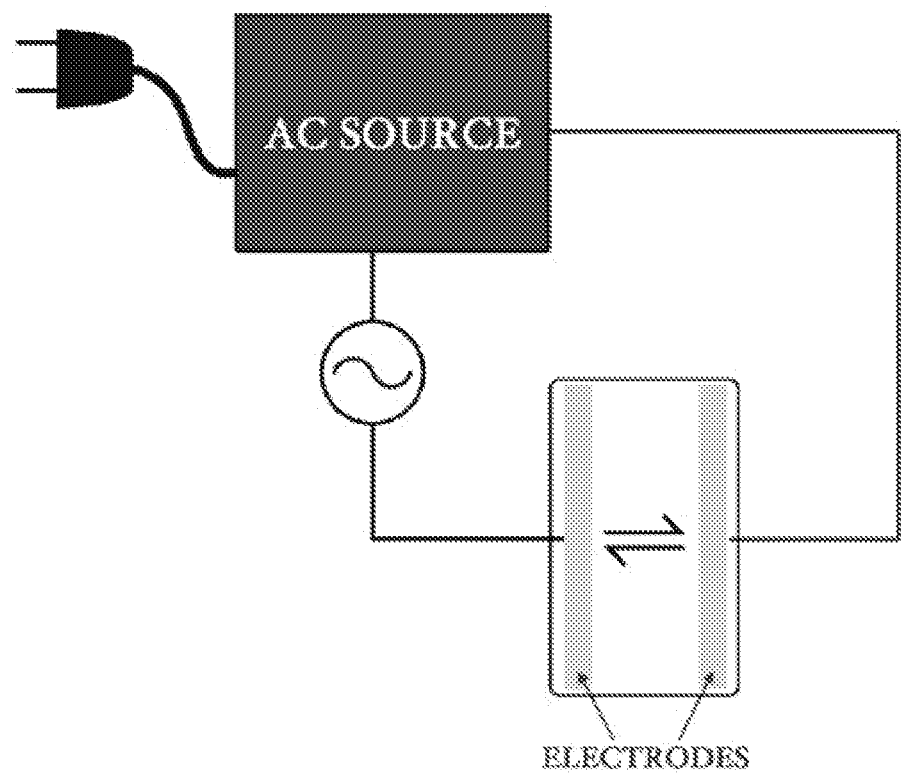
FIG. 1B is a schematic of treating electrodes with an alternating current, in accordance with the present disclosure.
Figure 2:
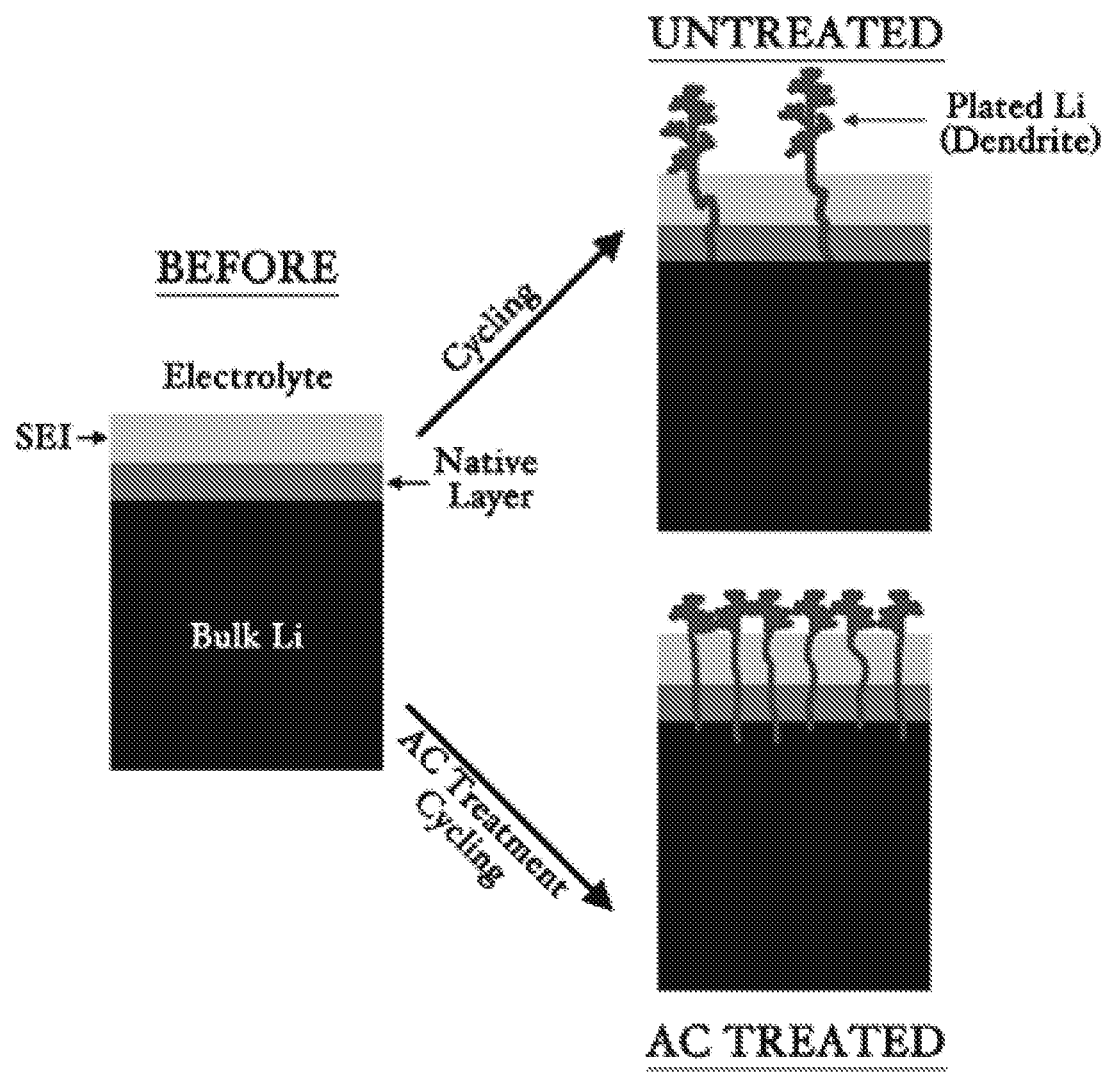
FIG. 2 is a schematic representation of the cycling stability of an electrode with and without alternating current treatment, in accordance with the present disclosure.

In one example embodiment of the method of the invention, a cell comprised of an anode, cathode and electrolyte is subjected to an alternating current as shown in FIG. 1B. The resulting effect of the AC treatment may tune the electrochemical activity of the metal (e.g., lithium, magnesium, sodium, zinc) electrode such that a more homogenous flux of metal ions crosses the electrode-electrolyte interface. This result may be caused by the treatment creating a multitude of low impedance sites by disrupting the solid electrolyte interphase (SEI) and the native surface layer. FIG. 2 shows an untreated cell with an SEI and native surface layer including erratically spaced low impedance pathways. Also seen in FIG. 2, this untreated cell can be compared with the treated cell that includes the multitude of low impedance sites created by the AC treatment.

A wide range of frequencies, wave shapes, and voltage or current amplitudes may be applied during the use of this method depending on the cell configuration, electrolyte, and materials used. It should be appreciated that the subsequent concepts discussed below may be prescribed in any appropriate permutation and the present disclosure is not limited to the following results.

Perturbation applied to the electrode may have a current density amplitude ranging from 0.05 to 20 $mA/cm^2$. Voltage perturbations resulting in a similar range of magnitudes of oscillating current density amplitude may have similar beneficial effects. The precise voltage selected for perturbations applied to the electrodes may depend on the potential of the electrodes undergoing perturbation. Using electrochemical impedance spectroscopy, effects from frequencies ranging from 100 kilohertz to 1 megahertz have been observed in the electrodes.

Figure 3:
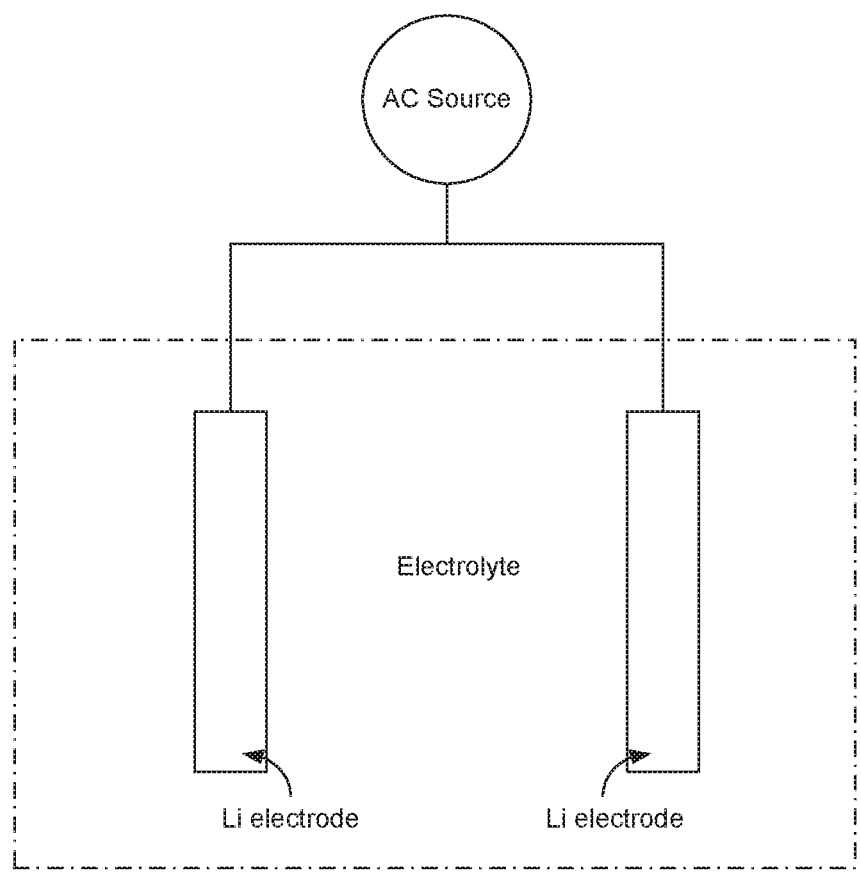
FIG. 3 is a schematic of an exemplary symmetrical lithium electrode cell connected to an alternating current source, in accordance with the present disclosure.

In a non-limiting example, a fabricated cell stack comprising a lithium-lithium (Li—Li) symmetric cell, where both the anode and cathode are lithium metal as shown in FIG. 3, is subjected to the AC perturbation treatment. Alternatively, in a battery cell of any full battery system where the anode is lithium metal and the cathode is a different material, such as a lithium containing metal oxide, the perturbation treatment may be isolated to the lithium metal anode and not applied to the cathode of a different material, by choosing the appropriate electrode as a zero voltage point of reference and applying voltage perturbations relative to that electrode. This isolated treatment may be advantageous in sparing the cathode from any negative effects the perturbation treatment may have. Moreover, a current controlled version of the AC treatment may be applied to any battery system where the treatment is desired for both anode and cathode. A good electrical contact with the anode or cathode is used. The location of the electrical contact may be varied to any location on the electrodes.

EXAMPLES

The following Examples are provided in order to demonstrate and further illustrate certain embodiments and aspects of the present invention and are not to be construed as limiting the scope of the invention.

Example 1

Figure 4:
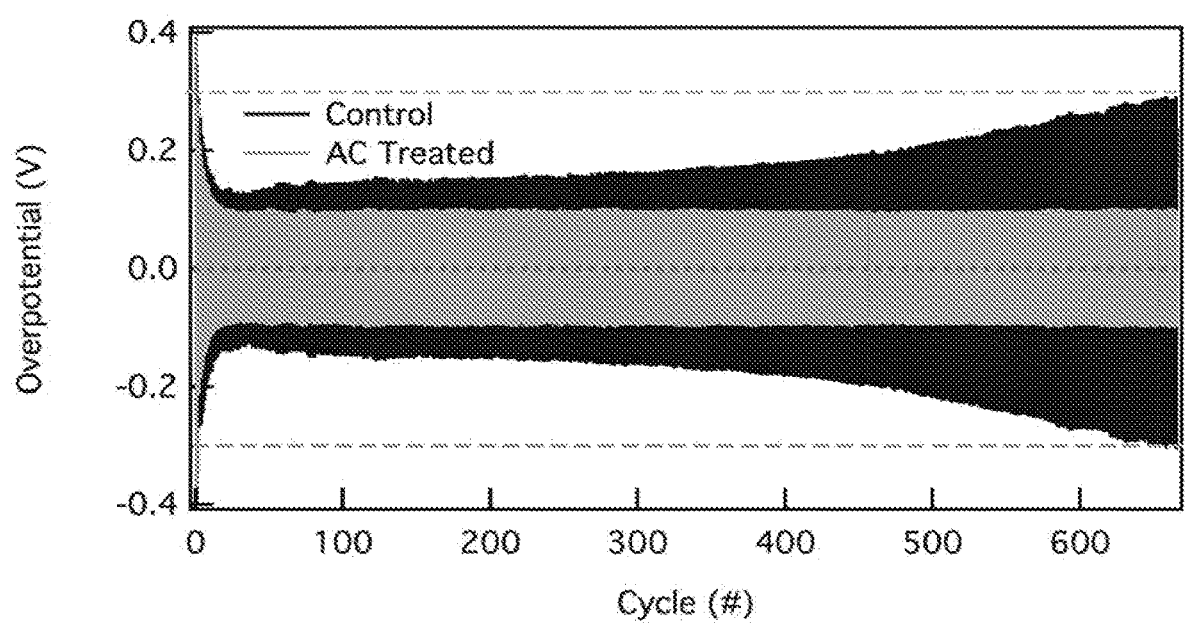
FIG. 4 is a graphical representation of the experimental results for electrode potential over a number of cycles in a treated and untreated cell, in accordance with the present disclosure.

A model battery system including a lithium anode and lithium cathode using $LiPF_6$ as an electrolyte and a Celgard 2320 polypropylene/polyethylene/polypropylene trilayer separator (0.028 μm average pore diameter) was subjected to an AC voltage perturbation of 0.5 V in amplitude at a frequency range from 700 Hz-200 Hz for 2 minutes. FIG. 4 shows the effects of AC treatment example on the lifetime of a lithium anode. The AC treated anodes exhibited far more stability as compared to the untreated anodes. Specifically, the AC treated electrodes exhibited markedly lower overpotentials and dramatically improved stability. This indicates that less degrading side reactions occurred with the surface of the AC treated lithium metal electrode and the electrolyte, as well as a more efficient transfer of charge species between the electrode and electrolyte.

Figure 5:
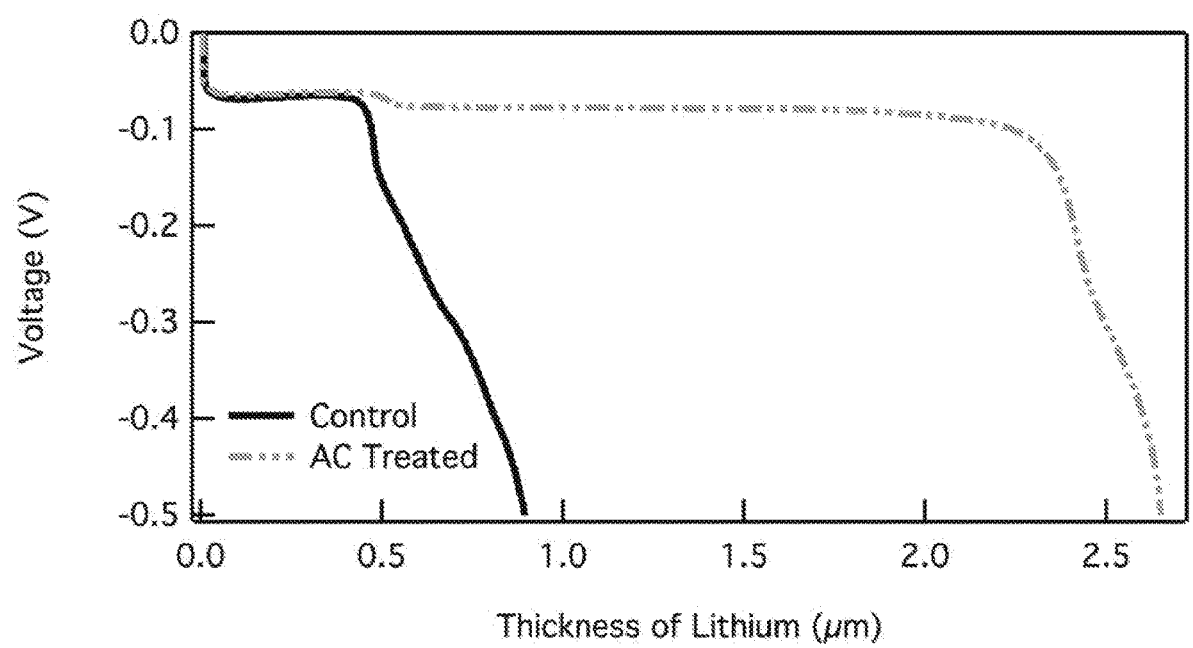
FIG. 5 is a chart showing the experimental results of the voltage versus the thickness of the Li layer after 40 cycles in a treated and untreated cell, in accordance with the present disclosure.
Figure 6:
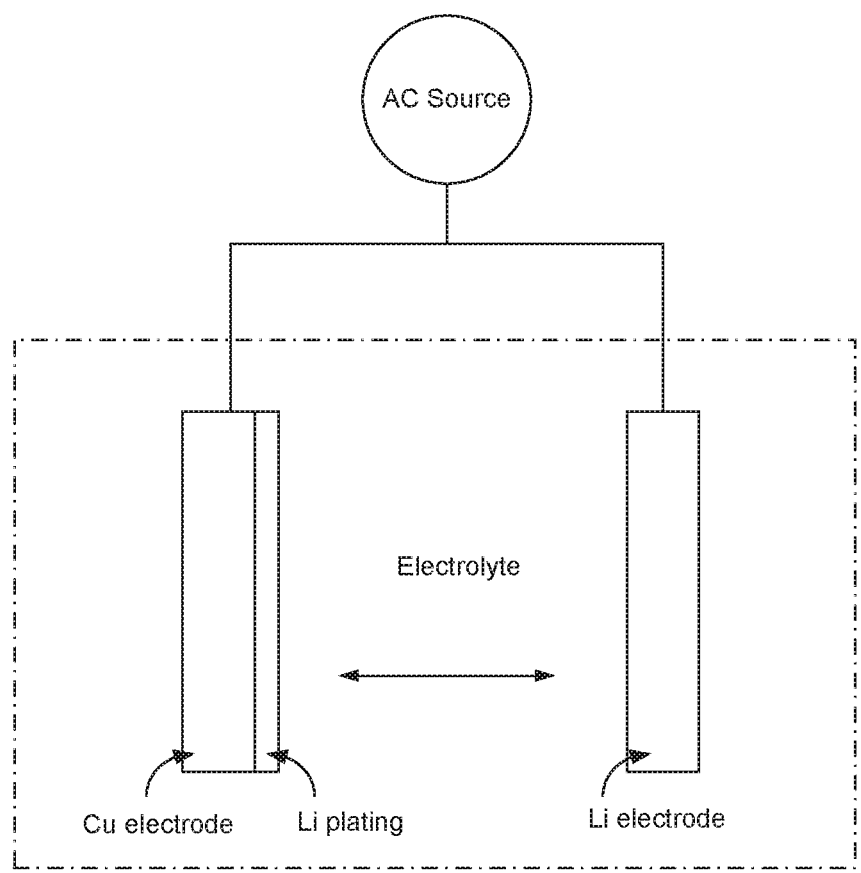
FIG. 6 is a schematic of exemplary lithium and copper electrodes used in strip plate tests and connected to an alternating current source, in accordance with the present disclosure.

To help confirm this result, lithium/copper cells were fabricated such that the AC treated lithium metal electrode acted as the anode and the copper as the cathode. A break-in cycle was used to help form the Cu-electrolyte interface, followed by plating 7.2 μm of lithium onto the copper electrode in $LiPF_6$ electrolyte. Then 10% of this plated lithium was shuttled back and forth between the electrodes for 39 cycles. On the 40th cycle, all of the lithium was then dissolved from the copper electrode. This provides a quantitative measure of the lithium remaining after 40 cycles. Data in FIG. 5 reveals a 300% improvement in the amount of lithium retained by pretreating the cell with an AC voltage perturbation. FIG. 6 shows a schematic of the electrode and AC source setup for the example described above.

Example 2

This Example describes a purely electrochemical method for improved coulombic efficiency and lifetime of lithium metal electrode batteries.

Lithium metal anodes are key to enable high energy density secondary battery systems however, at the present, these electrodes are plagued by uncontrolled side-reaction and unstable interfaces. Physical and chemical modifications of the solid electrolyte interphase (SEI) are well-documented methods for addressing these challenges. However, they are limited in performance and scalability, which has prevented widespread commercialization. In this Example, we demonstrate an in-situ electrochemical method for improving Li metal electrode performance without need for ex-situ protection strategies. By treating Li anodes with an alternating current (AC) perturbation, the performance of Li metal electrodes can be significantly improved. Cell lifetime at 1 mA/cm$^2$ is tripled, a deep discharge of a 750 μm thick electrode demonstrated a capacity of 3600 mAh/g, and a Coulombic efficiency of over 96% is demonstrated in carbonate-based electrolyte systems using Li metal foil.

Li metal electrodes have long been the holy-grail of battery anodes, owing to the low standard reduction potential and high gravimetric energy density [Ref. 1]. Because of severe dendrite propagation and safety concerns, though, Li metal anode development was sidestepped by Li-ion battery (LIB) research [Ref. 2]. However, a resurgence in Li metal anode research has been fueled by their potential application in Li-air and Li—S batteries as well as in current LIBs, where Li metal is utilized as an anode to dramatically improve energy density [Ref. 3].

Unfortunately, many of the challenges from the 1970s and 1980s persist, including low Coulombic efficiency (CE), poor cycle life, and safety concerns [Ref. 4]. Ultimately, all of these challenges can be linked to the uncontrolled reactivity of Li metal and undesirable side reactions between Li metal electrodes and the electrolyte. This causes a three-fold effect, where: (1) the uncontrolled reactivity of Li metal causes an inhomogeneous distribution of electrochemically active sites across the secondary electrolyte interphase (SEI), essentially creating 'hot-spots' for Li-ion nucleation [Ref. 5]; (2) these hot-spots lead to dendrite and pit formation, which causes short circuiting and safety concerns, as well as capacity loss if Li becomes trapped in electrically isolated dendrites known as 'dead Lithium' [Refs. 6 & 7]; and (3) dendrites and pits cause the increased consumption of electrolyte, as freshly exposed Li reacts with the electrolyte, causing electrolyte depletion, which increases the overpotential and eventually causes the cell to fail [Refs. 8-10].

Our recent work provided a rational framework to correlate the evolution of Li electrode morphology and electrochemistry, through a combination of operando video microscopy and numerical modeling [Ref. 7]. It was shown that the evolution of dendrites and pits is driven by transitions between reaction pathways at the electrode/electrolyte interfaces resulting from localized impedance variations (affected by both kinetics and surface area). During dissolution, Li is preferentially removed from previously plated Li (in the form of dendrites). When all active Li is removed from dendrites, the lowest impedance sites form pits. Similarly, during deposition Li is preferentially plated onto existing dendrites. If no active dendrites exist during the initial stages of deposition, nucleation occurs. The distribution of the nucleation events and size of the dendrites is directly affected by the homogeneity of low impedance sites on the surface. The nucleation density and dendrite size can be correlated to overall electrode performance [Ref. 7]. Denser and more uniformly spaced nucleation sites lead to smaller and more reversible dendrites that improve cell performance. This indicates that creating an interface with a multitude of similar impedance sites is required for improved Columbic efficiency, Li anode lifetime and cell safety.

However, much of the current work in stabilizing Li metal anodes has focused on suppressing dendrite growth by modifying SEI behavior through physical or chemical means. Several groups have demonstrated highly efficient Li metal anodes by modifying electrolyte solvents [Refs. 5, 11-13], increasing salt concentrations [Ref. 11], and using additives to allow for a more homogeneous flux of Li ion across the interface [Ref. 14]. Meanwhile, other groups have successfully improved electrode performance by applying physical coatings of ultrathin ceramic layers, such as $Al_2O_3$, which affect both the mechanical and chemical properties of the SEI [Refs. 9 & 15], or by adding free standing films to improve flux homogeneity [Ref. 5]. Additionally, Park et al. demonstrated a unique and effective strategy for physically modifying the surface to create more uniform nucleation sites, where a needle roller was used to pattern the electrode surface before cycling [Ref. 16]. Furthermore, other work demonstrated the concept of a Li scaffold, where lithiophilic host materials were used to improve the stability of the electrode/electrolyte interface [Refs. 17-19]. While many of these strategies are promising, most use one or more of the following: ether based electrolyte environments, which are more flammable and less compatible with industrial techniques; extra equipment or more expensive processing; or inactive material within the electrode, reducing the theoretical capacity.

In this Example, we present in-situ electrochemical treatment as an additional method for improving electrode performance, which enables improved Coulombic efficiency and long cycle life of a pure Li metal electrode in carbonate electrolyte systems, with little to no extra equipment or processing required. Through the use of an alternating current (AC) perturbation, Li metal electrodes can be engineered to have a greater density and improved uniformity of active sites on the surface, in a matter of minutes after a cell has been assembled.

Li metal foil has an unavoidable native layer, mostly in the form of oxides, nitrides and carbonates, which is strongly affected by the manufacturing, processing, and handling conditions [Refs. 20-21]. Once Li comes into contact with the electrolyte, a solid electrolyte interphase (SEI) forms on the surface. These combined factors create a inhomogeneous distribution of localized impedances across the surface. Upon cycling, this causes a non-uniform distribution of nucleation sites as seen in the top of FIG. 7.

Figure 7:
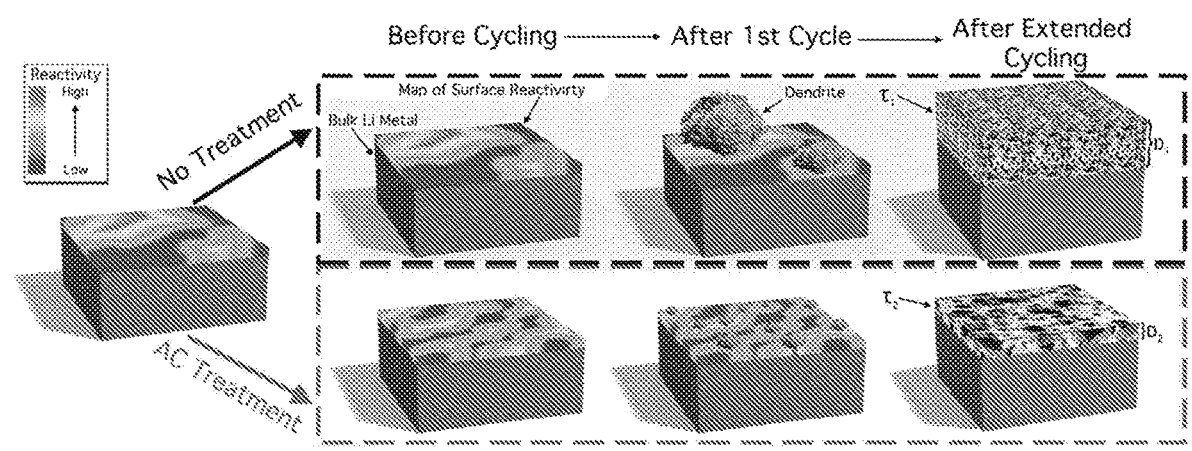
FIG. 7 is a schematic representation of how AC treatment effects surface reactivity and its effects after cycling. The AC treatment creates a more uniform distribution of reaction sites across the surface. As a result, dendrites on the AC treated sample are smaller and more uniform. Upon extended cycling, these small dendrites on the AC treated electrode surface lead to a smaller ($D_2$) and less tortuous dead Li layer ($\tau_2$). Compared to the untreated electrode $D_2<D_1$ and $\tau_2<\tau_1$, this enables extended cycling and better performance.

In this Example, we demonstrate that nucleation site distribution can be modified by applying either a current-controlled or voltage-controlled AC perturbation (FIG. 7 bottom). This treatment can be targeted at different interfaces by varying the frequency of the perturbation. Through the use of a technique like electrochemical impedance spectroscopy (EIS), the frequency response of a system can be used to determine which frequencies affect specific interfaces within a battery system. That understanding can subsequently be used to tailor the electrochemical treatment, targeting specific interfaces and enabling optimization for a variety of electrode/electrolyte systems. The AC treatment increases the number of similar impedance sites across the surface, leading to a more homogeneous distribution of nucleation sites. This results in smaller and more reversible dendrites (FIG. 7, bottom). After many cycles, this leads to a dramatic reduction in the amount of 'dead' Li and correspondingly a reduction in the overpotential required to drive Li diffusion through the porous layer to the active surface of the Li electrode. This exemplifies the fact that the behavior observed during the initial cycle(s) play an important role in the performance of the cell throughout its life. Therefore, normalizing the reactivity of the Li surface and increasing nucleation density by AC treatments is a beneficial method of improving performance of Li metal anodes.

This was confirmed through the use of operando optical microscopy in a custom designed visualization cell. For Li metal electrodes in a traditional $LiPF_6$ 1M ethylene carbonate (EC): ethyl methyl carbonate (EMC) (1:1) solution, an AC perturbation frequency was chosen such that the electrode/SEI interface was probed. A current-controlled signal at an amplitude of 1 $mA/cm^2$ or a voltage-controlled signal of 0.5 V, was then applied for approximately 5 minutes after the cell was fully assembled.

Figure 8:
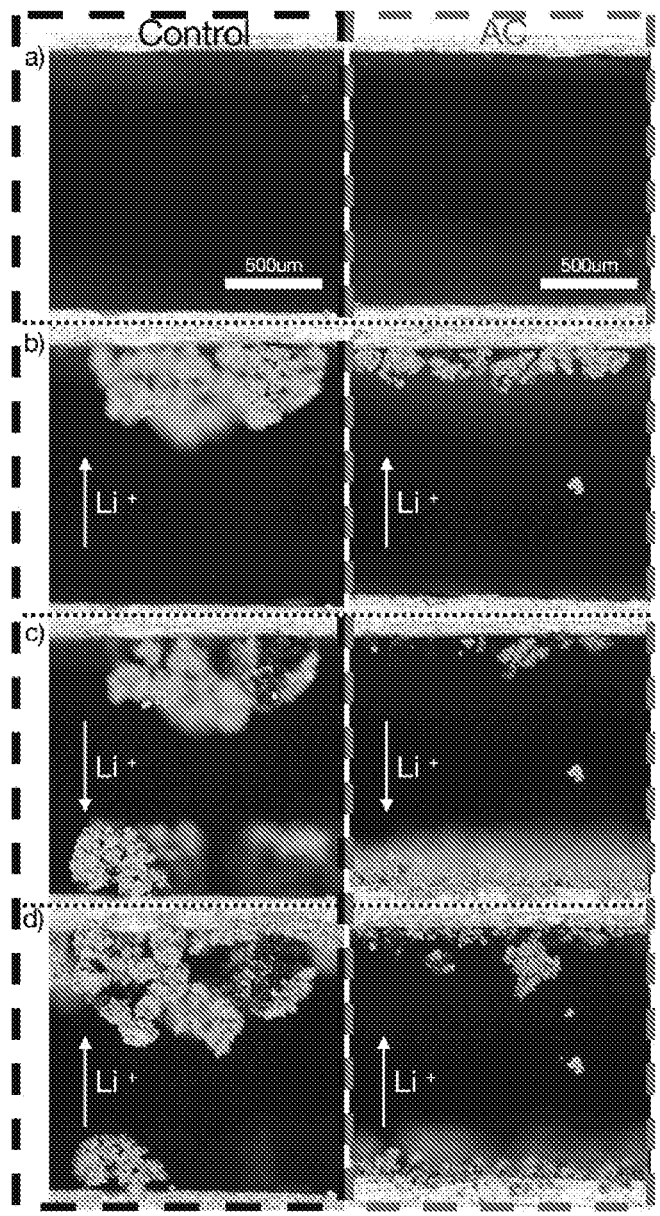
FIG. 8 shows operando visualization cell images for the Control (left column) and AC treated (right column) electrodes cycled at 1 mA/cm². Both Li electrodes in each symmetric cell were untreated (control) or AC treated (AC). The images shown in section a) reveal electrode morphology before cycling, in section b) after electrodeposition on the top electrode, in section c) deposition on the bottom electrode, and in section d) after a second deposition of Li⁺ on the upper electrode.

The images shown in FIG. 8 are still frames acquired from a video taken. The pristine electrodes and electrolyte before cycling can be seen in the top row of FIG. 8. As cycling begins, two or three large dendrites form on the surface of the control cell, while the AC treated sample exhibits many smaller dendrites (see the second row down in FIG. 8). Upon switching polarity an even more dramatic effect is observed, as only three dendrites are observed for the control electrode, while a dense coverage of small, carpet-like dendrites is seen on the treated electrodes (see the third row down in FIG. 8). Upon further cycling, it can also be observed that Li is more completely removed from dendrites on the AC sample (see the bottom row down in FIG. 8), indicating a higher degree of reversibility for dendrites on the treated electrodes.

Figure 9:
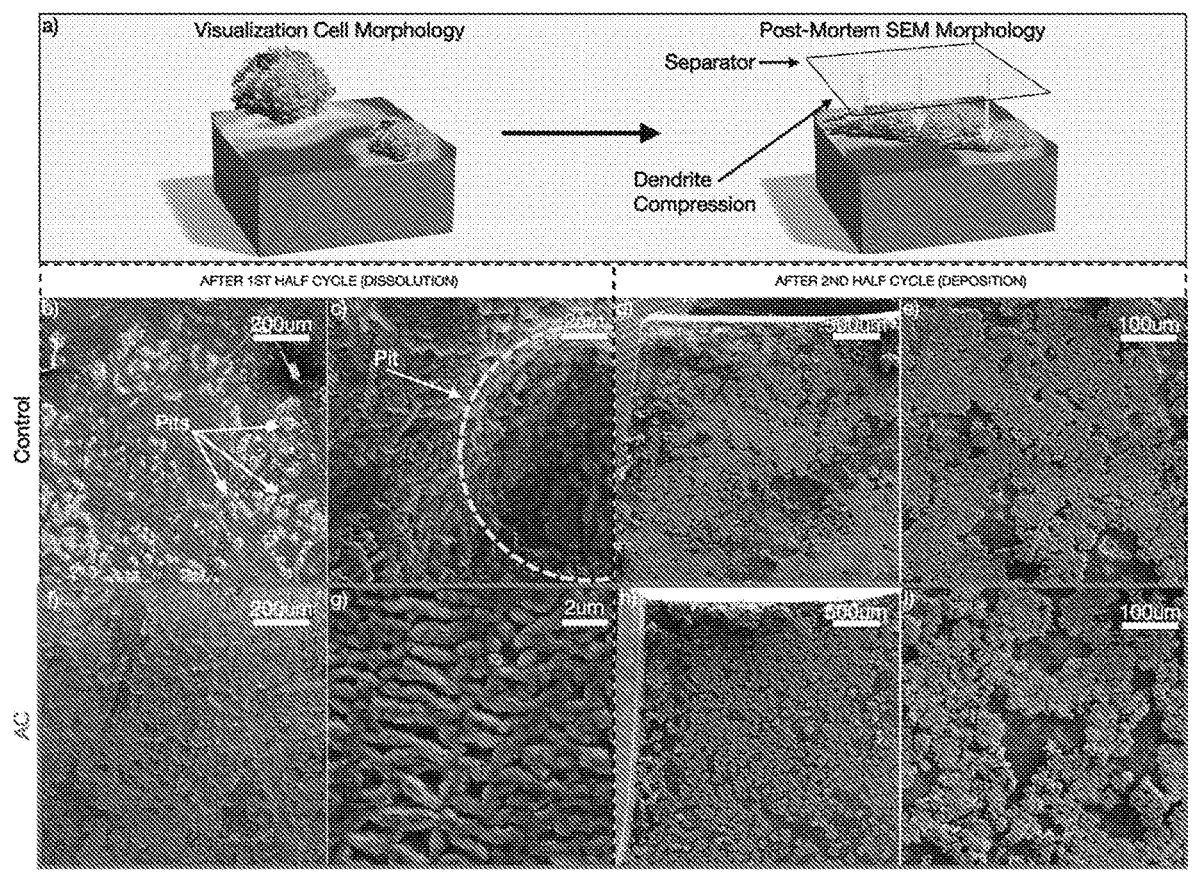
FIG. 9 is in section a), a schematic representation of the effect of separator and compression on dendrite morphology as observed in post-mortem SEM. SEM images of the control Li metal anode (in sections b-e), and AC treated Li metal anode (in sections f-l) taken after cycling at 1 mA/cm² for 1 hour half cycles. Images in section b) and in section c) show sporadic deep pits on the control electrode during dissolution. By comparison, the AC treated electrode shown in section f) and in section g) reveal much smaller and more evenly spaced areas of dissolution. Upon changing polarity of the current, deposition occurs within the pits. For the control sample shown in section d) and in section e), these new deposits appear in the form of large agglomerated dendrites showing significant amounts of compression due to the limited number of dendrites that grow into contact with the separator. For the AC treated sample shown in section h) and in section i), the Li deposits form in much more ordered locations across the surface and with a much greater density. As a result, these dendrites are less agglomerated and appear less compressed because of a more evenly distributed load.

To further demonstrate the effects of AC treatment on the growth of dendrites and pits, control and AC-treated Li symmetric cells were cycled at 1 $mA/cm^2$ for 1 $mAh/cm^2$ in a coin cell environment. Cells were then disassembled for SEM imaging after both 1 and 2 half cycles; these results are shown in FIG. 9. After dissolution during the first half cycle, deep, randomly spaced pits are observed across the control electrode surface (FIG. 9, sections b/c). However, the AC treated sample exhibits smaller and more shallow pits, which appear more evenly spaced across the electrode (FIG. 9, sections f/g). Additionally, the AC treated sample exhibits a finer structure in the areas surrounding the pits which is not present in the control (FIG. 9, sections c/g). Upon changing polarity ($2^{nd}$ half cycle), Li is deposited into the pits created during the first half cycle. For the control electrode, this creates large agglomerations of dendrites covering the surface. This arises from dendrites growing out of the few deep, randomly dispersed pits, which are then being compressed by the separator and forced to grow parallel to the electrode surface (FIG. 9, section a). Eventually, the dendrites agglomerate together, as shown in FIG. 9, sections d/e. By comparison, the AC treated electrode demonstrates dendrites, which are more densely and evenly spaced, but have much less agglomeration because of the smaller size of each dendrite (FIG. 9, sections h/i). This allows for better utilization of previously deposited Li causing the dendrites to be more reversible in the AC treated sample. Consequently, a greater force is applied to the larger dendrites and larger amount of dead Li on the control sample surface, leading to the formation of a denser and more tortuous pathway for Li ion diffusion to the surface of the electrode when compared to the AC sample (FIG. 7; $D_1 > D_2$ and $\tau_1 > \tau_2$).

Figure 10:
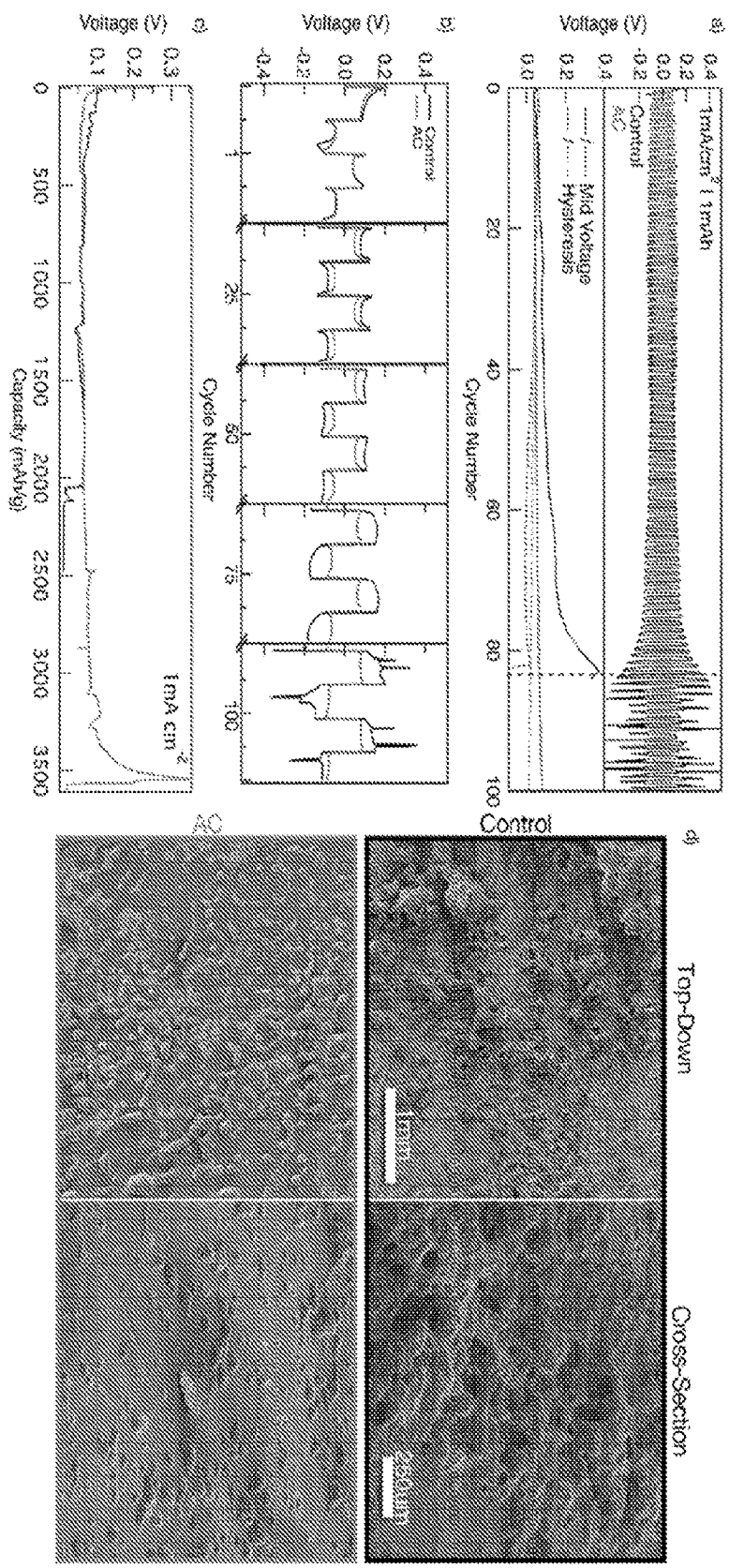
FIG. 10 is an electrochemical performance comparing control and AC treated electrodes at 1 mA/cm². Li symmetric cell voltage vs time profile data (depth of discharge: 1 mAh/cm²) is shown in section a) along with the voltage at the middle of each half cycle (mid volt) and the voltage hysteresis comparing the difference between middle and end voltage values. A higher resolution plot of these traces at 1, 25, 50, 75 and 100 cycles is shown in section b). A continuous galvanostatic deposition of Li from one electrode to the other revealing how voltage evolves as a function of capacity is shown in section c). In section d), SEM images for the control (top row) and AC treated (bottom row) electrodes taken after 300 cycles at 1 mA/cm² with a depth of discharge of 0.2 mA/cm² confirm the hypothesis shown in FIG. 7.
Figure 11:
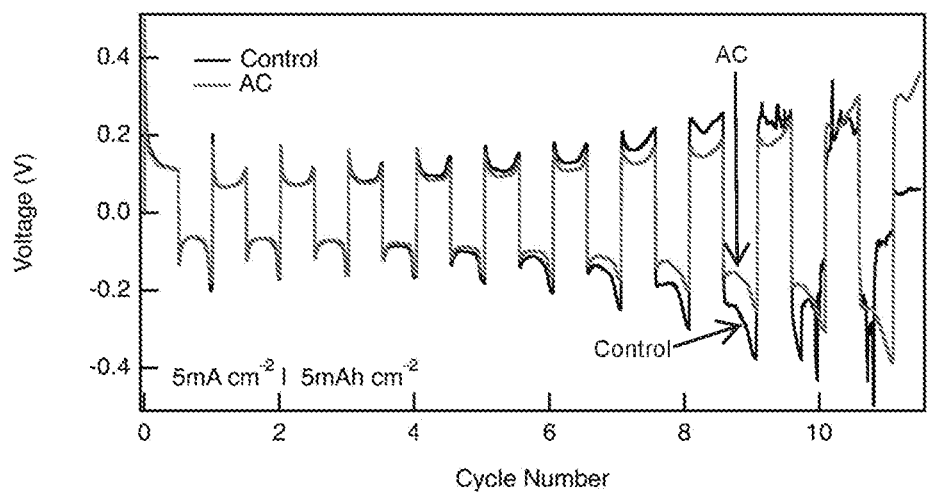
FIG. 11 is a graphical representation of the experimental results for electrode potential over a number of cycles in a treated and untreated cell, in accordance with the present disclosure.
Figure 12:
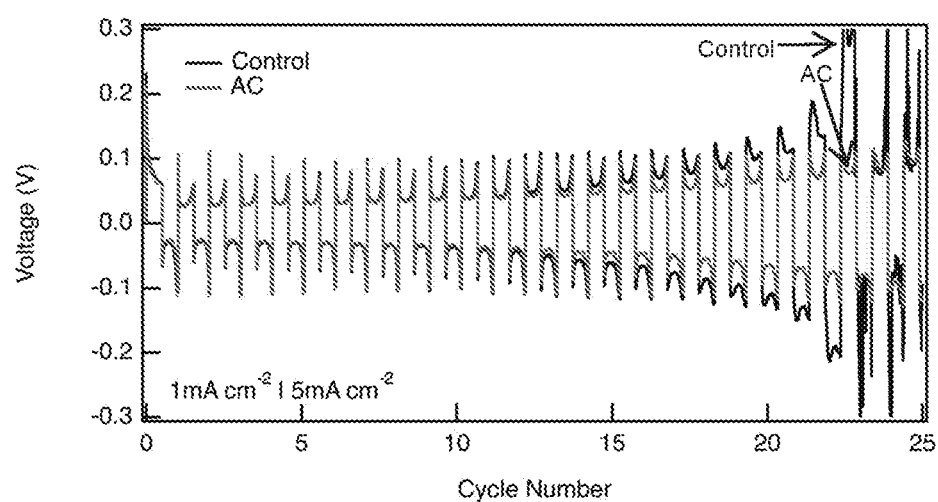
FIG. 12 is a graphical representation of the experimental results for electrode potential over a number of cycles in a treated and untreated cell, in accordance with the present disclosure.
Figure 13:
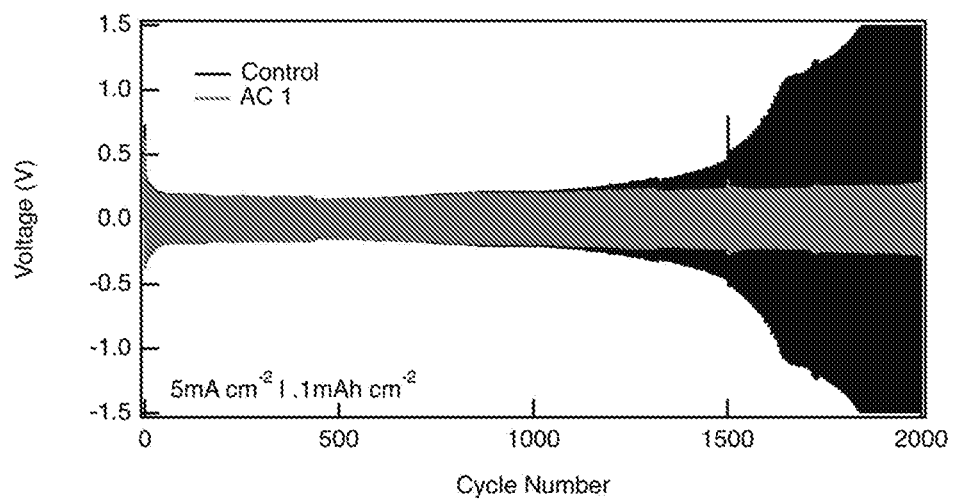
FIG. 13 is a graphical representation of the experimental results for electrode potential over a number of cycles in a treated and untreated cell, in accordance with the present disclosure.
Figure 14:
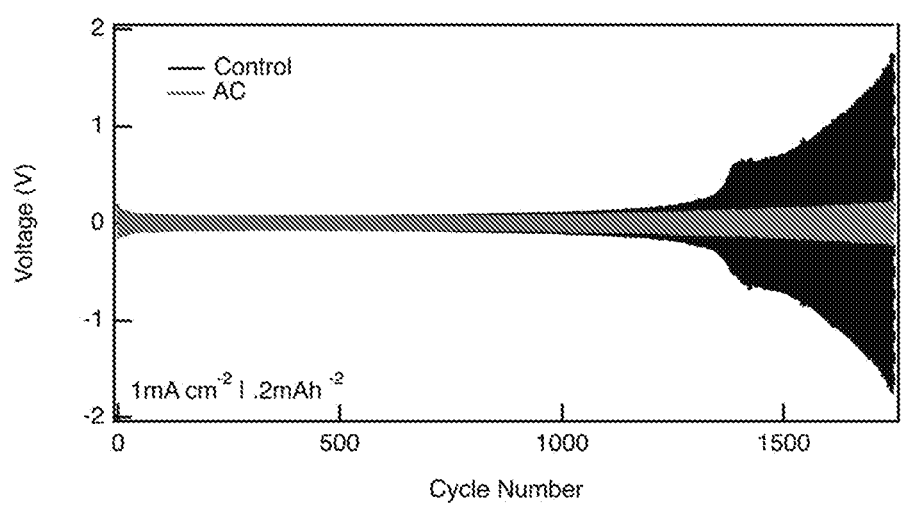
FIG. 14 is a graphical representation of the experimental results for electrode potential over a number of cycles in a treated and untreated cell, in accordance with the present disclosure.
Figure 15:
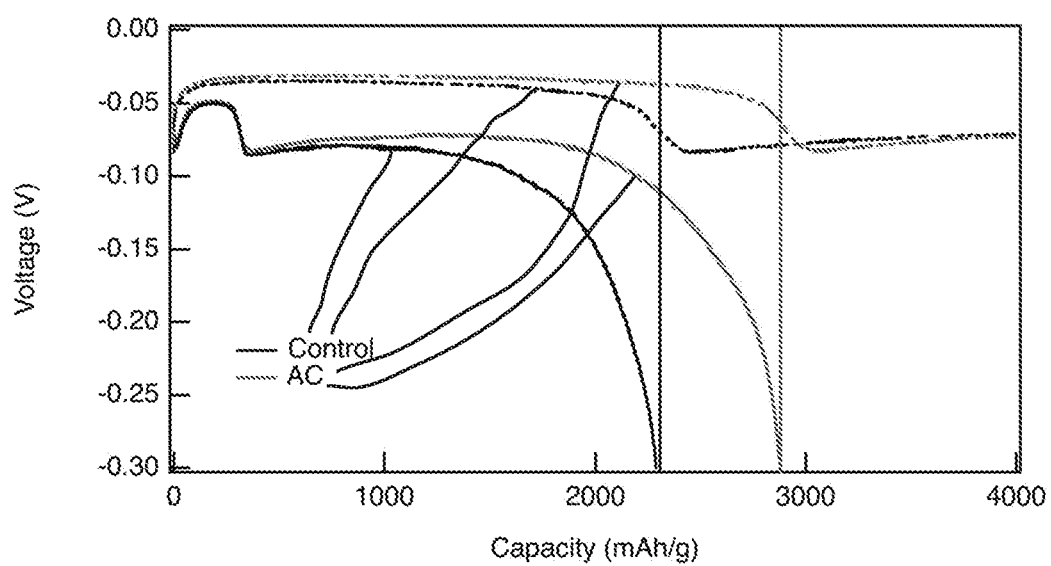
FIG. 15 is a graphical representation of the experimental results for voltage vs. capacity in a treated and untreated cell, in accordance with the present disclosure.
Figure 16:
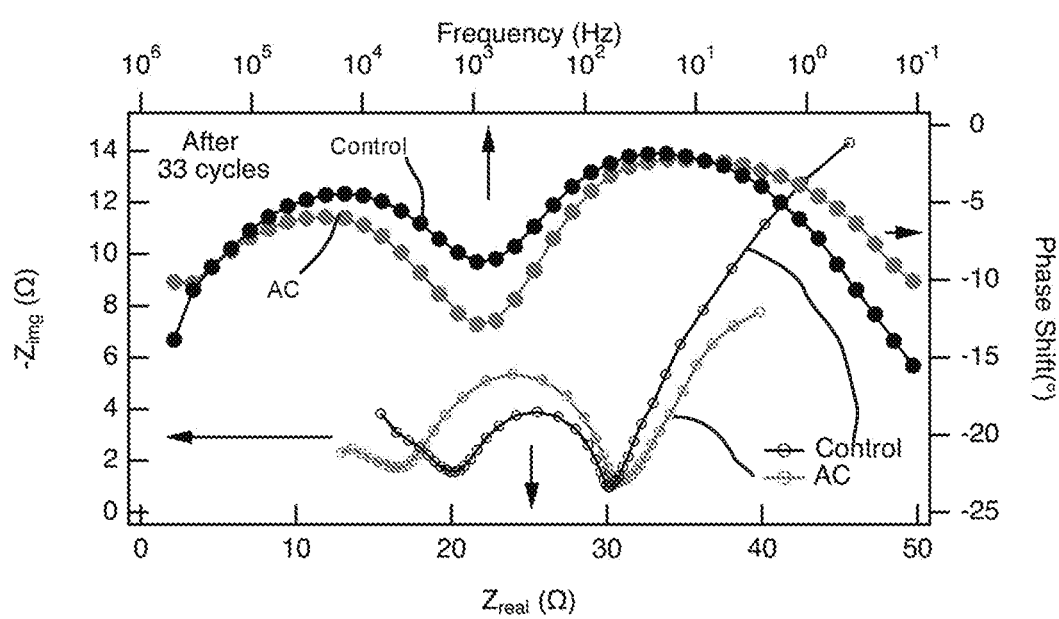
FIG. 16 is a graphical representation of the experimental results for impedance imaginary vs. impedance real and phase shift vs. frequency in a treated and untreated cell, in accordance with the present disclosure.
Figure 17:
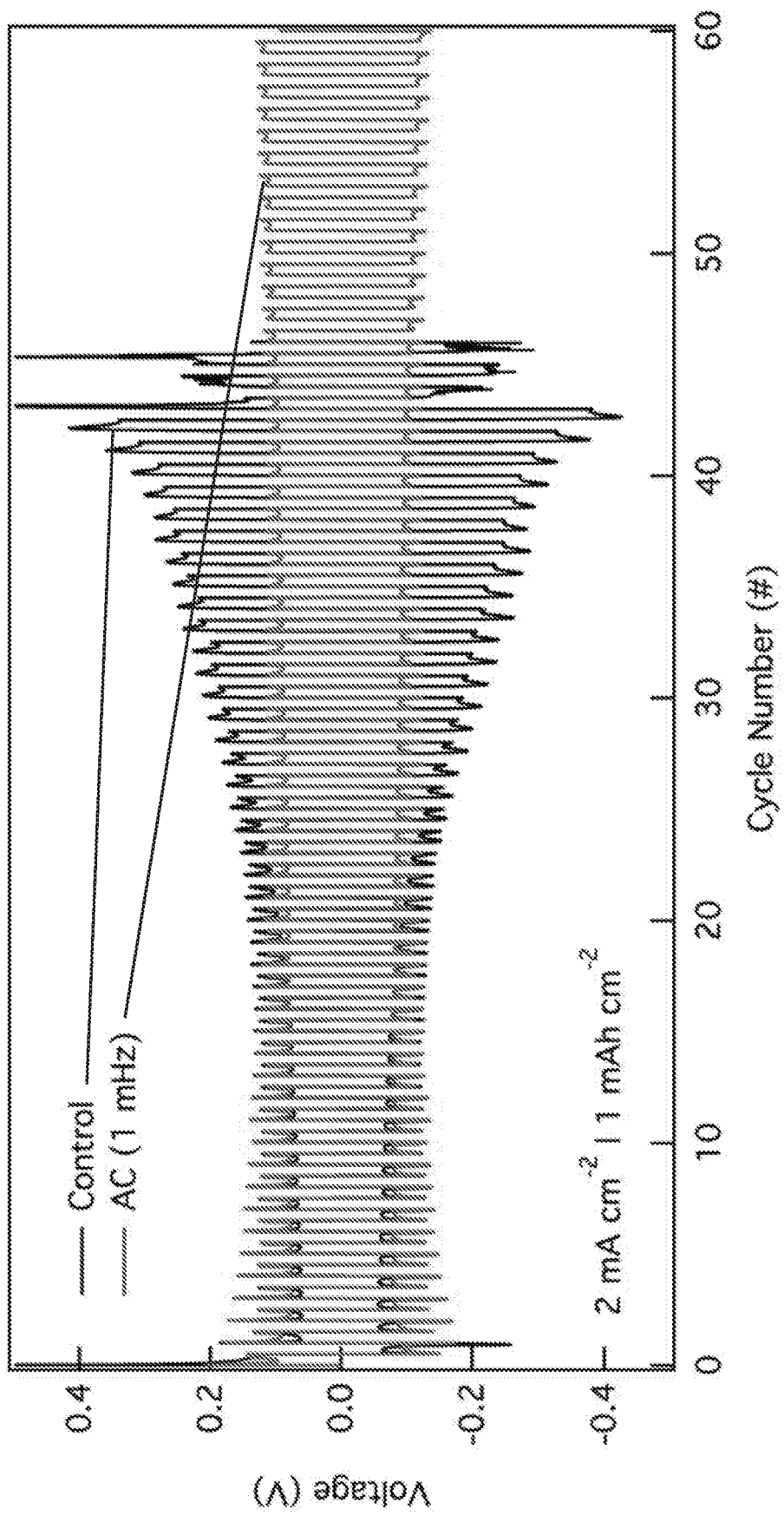
FIG. 17 is a graphical representation of the experimental results for electrode potential over a number of cycles in a treated and untreated cell, in accordance with the present disclosure.
Figure 18:
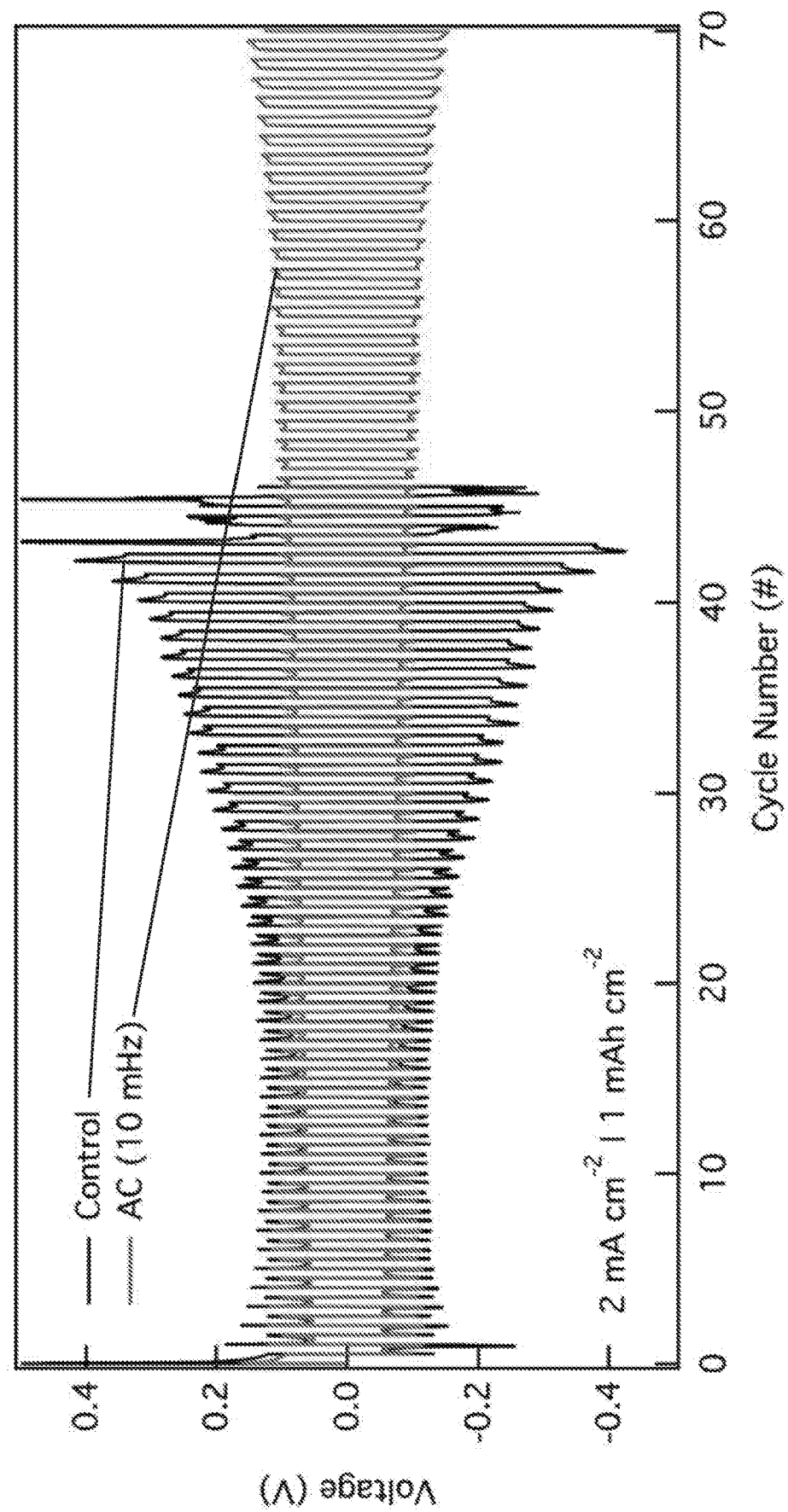
FIG. 18 is a graphical representation of the experimental results for electrode potential over a number of cycles in a treated and untreated cell, in accordance with the present disclosure.
Figure 19:
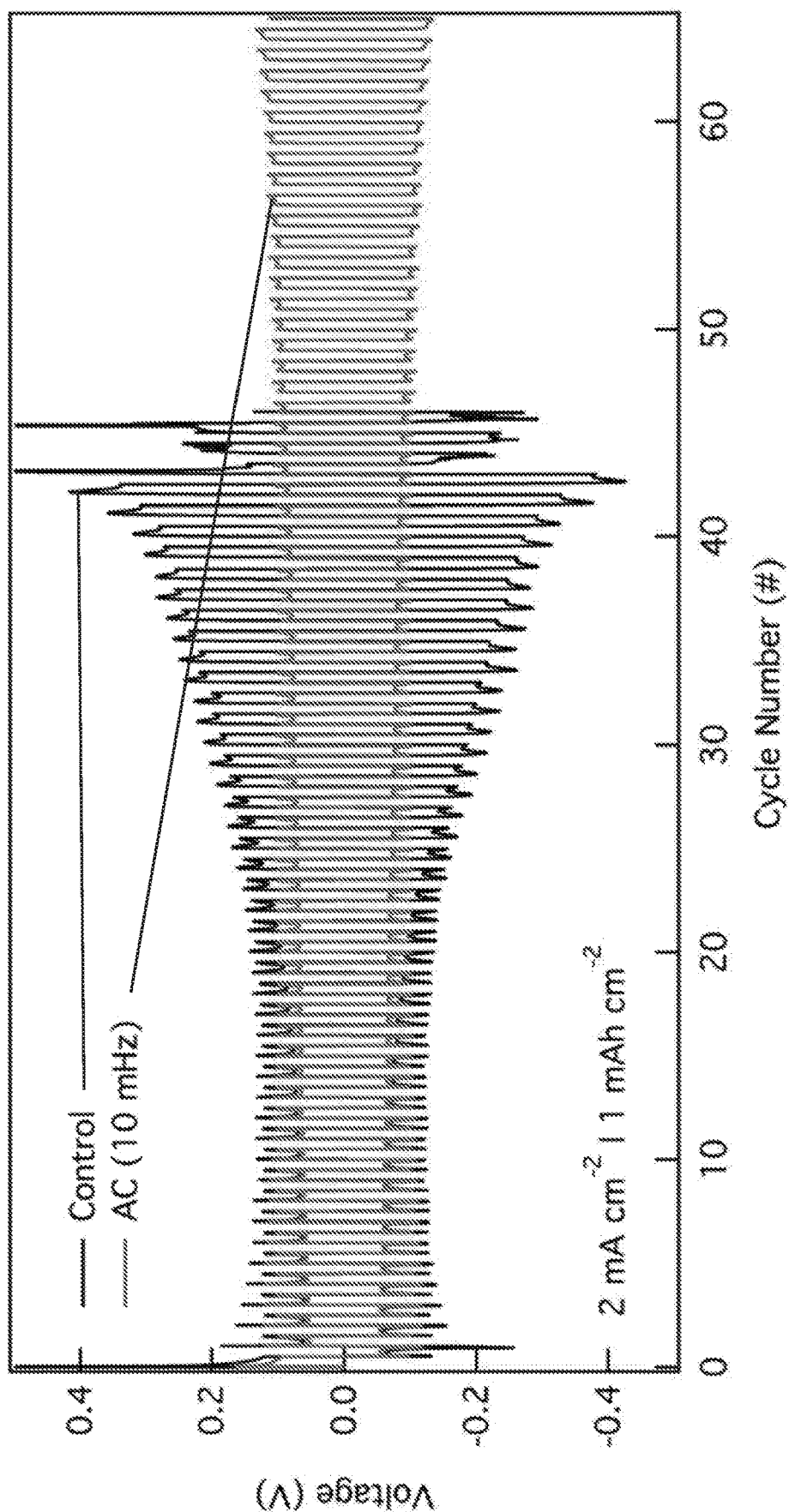
FIG. 19 is a graphical representation of the experimental results for electrode potential over a number of cycles in a treated and untreated cell, in accordance with the present disclosure.

To show how this effect of improved dendrite morphology, reversibility, and stability improves cell performance a suite of electrochemical tests were performed using Li symmetric cells. The results for cells cycled at 1 $mA/cm^2$ are shown in FIG. 10. Further data at other current densities and depths of discharge are shown in FIGS. 11-19. In FIG. 10, section a, the voltage vs time trace for Li Metal anodes cycled at 1 $mAh/cm^2$ demonstrates much improved stability of anodes after AC treatment. In this data, the control cell appears stable for the first 60 cycles, then an exponential increase in overpotential begins until the cell fails via dendrite shorting. This fuse-like effect (where a dendrite melts because of high current flowing through the small cross section area of the dendrite after contact with the other electrode) is indicated by the erratic voltage behavior after cycle 83. This transition can be even more clearly observed by studying the voltage hysteresis of each half cycle (FIG. 10, section a, lower graph). Initially, the difference between the voltage during the middle of the cycle and end of the cycle are well defined for the control. However, after the 60 cycle mark, the voltage hysteresis approaches zero and the overpotential increases. This quickly escalating effect is due to a build-up of a thick, highly tortuous layer of dead Li. As this layer reaches a critical thickness and the electrolyte decomposes, a transition to more needle-like dendrite structures occurs resulting from the Li ion concentration reaching zero at the active interface (sands time). Finally, once shorting occurs the voltage hysteresis falls well below zero. By comparison, the voltage profile for the AC treated sample is remarkably flat, devoid of voltage increases associated with electrolyte decomposition and/or large quantities of dead Li. Indeed, in the AC treated cell, the only voltage variations that occur are of electrode kinetic effects, as indicated by the 'peaking' behavior seen in FIG. 10, section c. As documented in other work [Ref. 7], the sharpness of these transitions is related to the difference in impedance between the SEI on the bulk surface and the freshly plated Li. For carbonate electrolyte systems paired with Li foil, this difference is substantial and creates well defined peaks until other effects (i.e., mass transport or changes in electrolyte composition) begin to dominate the system. From FIG. 10, section c, it is clear that for the untreated sample electrode effects are no longer dominant after ~50 cycles. However, cell polarization variations arising from kinetics remain well defined in the AC treated cell for greater than 100 cycles. SEM images shown in FIG. 10, section d, confirm this by revealing large amounts of dead lithium present on the surface of the control after extended cycling. However, the AC electrode shows little sign of dead Li build up and clearly reveals the improved utilization and reversibility Li deposition and dissolution.

To show the effects of AC treatment on capacity, a 155 mAh/cm$^2$ Li electrode was dissolved under constant current conditions (1 mA/cm$^2$), FIG. 10, section c. For the control electrode, only ~80 mAh/cm$^2$ was dissolved until a dendritic short occurred prohibiting further operation of the cell, demonstrating a capacity of 2000 mAh/g, well below the theoretical limit. However, for the AC treated sample, the entire electrode was able to be dissolved without a dendritic short (voltage increase attributed to reaching stainless steel spacers) corresponding to a capacity of 145 mAh/cm$^2$ and 3600 mAh/g. This demonstrates the remarkable improvement in capacity, depth of discharge and cycling efficiency. Indeed, average coulombic efficiency (aCE) measurements shown in FIGS. 10-16 show an average Columbic efficiency (aCE) as high as 96% using Li metal foil in a carbonate electrolyte system. While this specific treatment was shown effective at a range of current densities (see FIGS. 10-16), the parameter space for optimization of these parameters is very large and in this Example was only optimized for initial cycling at 1 mA/cm$^2$. Therefore, it is envisioned that more optimized conditions can be achieved.

This Example has shown that an electrochemical treatment of Li metal electrodes is a viable approach for improving Li metal lifetime, stability, and performance. AC perturbations were demonstrated as an effective means of improving the total performance of Li dissolution and deposition. Under galvanostatic cycling conditions at 1 mA/cm$^2$, dramatic improvements in cycle life were observed as well as improvements in capacity and efficiency. These results demonstrate that AC treated Li metal electrodes can attain a practical capacity of 3600 mAh/g and a Coulombic efficiency of over 96% in a carbonate electrolyte system. In total, these results demonstrate that a simple, scalable and cost effective strategy can make Li metal electrodes a reality.

REFERENCES

1. Whittingham, M. S., *Science* (80-.). 1976, 192 (4244), 1126.
2. Aurbach, D.; Zinigrad, E.; Teller, H.; Dan, P.; *J. Electrochem. Soc.* 2000, 147 (4), 1274.
3. Choi, J. W.; Aurbach, D.; *Nat. Rev. Mater.* 2016, 1 (4), 16013.
4. Gallagher, K. G.; Goebel, S.; Greszler, T.; Mathias, M.; Oelerich, W.; Eroglu, D.; Srinivasan, V.; *Energy Environ. Sci.* 2014, 7 (5), 1555.
5. Zheng, G.; Lee, S. W.; Liang, Z.; Lee, H.-W.; Yan, K.; Yao, H.; Wang, H.; Li, W.; Chu, S.; Cui, Y.; *Nat. Nanotechnol.* 2014, 9 (8), 618.
6. Mehdi, B. L.; Qian, J.; Nasybulin, E.; Park, C.; Welch, D. a.; Faller, R.; Mehta, H.; Henderson, W. a.; Xu, W.; Wang, C. M.; Evans, J. E.; Liu, J.; Zhang, J.-G.; Mueller, K. T.; Browning, N. D.; *Nano Lett.* 2015, 15, 2168.
7. Wood, K. N.; Eric Kazyak; Chadwick, A. F.; Chen, K.-H.; Zhang, J.-G.; Thornton, K.; Dasgupta, N. P.; *Submitted.*
8. Bieker, G.; Bieker, P. M.; Winter, M.; *Phys. Chem. Chem. Phys.* 2015, 17, 8670.
9. Kazyak, E.; Wood, K. N.; Dasgupta, N. P.; *Chem. Mater.* 2015, 27 (18), 6457.
10. Aurbach, D.; *Solid State Ionics* 2002, 148 (3-4), 405.
11. Qian, J.; Henderson, W. a.; Xu, W.; Bhattacharya, P.; Engelhard, M.; Borodin, O.; Zhang, J.-G.; *Nat. Commun.* 2015, 6, 6362.
12. Assary, R. S.; Curtiss, L. A.; Moore, J. S.; *J. Phys. Chem. C* 2014, 118 (22), 11545.
13. Sun, F.; Wang, J.; Long, D.; Qiao, W.; Ling, L.; Lv, C.; Cai, R.; *J. Mater. Chem.* A 2013, 1 (42), 13283.
14. Li, W.; Yao, H.; Yan, K.; Zheng, G.; Liang, Z.; Chiang, Y.-M.; Cui, Y.; *Nat. Commun.* 2015, 6 (May), 7436.
15. Kozen, A. C.; Lin, C.-F.; Pearse, A. J.; Schroeder, M. A.; Han, X.; Hu, L.; Lee, S.-B.; Rubloff, G. W.; Noked, M.; *ACS Nano* 2015, 9 (6), 5884.
16. Park, J.; Jeong, J.; Lee, Y.; Oh, M.; Ryou, M.-H.; Lee, Y. M.; *Adv. Mater. Interfaces* 2016, 1.
17. Lin, D.; Liu, Y.; Liang, Z.; Lee, H.-W.; Sun, J.; Wang, H.; Yan, K.; Xie, J.; Cui, Y.; *Nat. Nanotechnol.* 2016, No. March, 1.
18. Liang, Z.; Lin, D.; Zhao, J.; Lu, Z.; Liu, Y.; Liu, C.; Lu, Y.; Wang, H.; Yan, K.; Tao, X.; Cui, Y.; *Proc. Natl. Acad. Sci.* 2016, 201518188.
19. Liu, Y.; Lin, D.; Liang, Z.; Zhao, J.; Yan, K.; Cui, Y.; *Nat. Commun.* 2016, 7, 10992.
20. Peled, E.; *J. Power Sources* 1983, 9 (3), 253.
21. Peled, E.; *J. Electrochem. Soc.* 1979, 126 (12), 2047.

The citation of any document is not to be construed as an admission that it is prior art with respect to the present invention.

Thus, the present invention provides methods for the treatment of electrodes with alternating current to improve battery cell performance and durability.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for treating a metal electrode wherein the metal electrode comprises one of an anode or a cathode of an electrochemical cell, the method comprising:
    (a) connecting an alternating current source to the electrochemical cell; and
    (b) subjecting the electrochemical cell to an alternating current perturbation, while the metal electrode is in contact with an electrolyte, for a treatment time,
    wherein the metal electrode comprises a metal selected from the group consisting of lithium, magnesium, sodium, and zinc, and
    wherein the alternating current perturbation is isolated to just one of the anode and the cathode of the electrochemical cell.

2. The method of claim 1, wherein the electrolyte is a liquid electrolyte comprising a lithium compound in an organic solvent.

3. The method of claim 2, wherein the lithium compound is selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf).

4. The method of claim 2, wherein the organic solvent is selected from carbonate based solvents, ether based solvents, ionic liquids, and mixtures thereof.

5. The method of claim 4 wherein:
the carbonate based solvent is selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and
the ether based solvent is selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

6. The method of claim 1, wherein the electrolyte is a liquid electrolyte comprising a magnesium compound in an organic solvent.

7. The method of claim 1, wherein the metal electrode comprises lithium.

8. The method of claim 1, wherein the metal electrode comprises magnesium.

9. The method of claim 1, wherein the alternating current source is voltage controlled, and the alternating current perturbation has an amplitude between about 0.05 V and 1.0 V.

10. The method of claim 1, wherein the alternating current source is voltage controlled, and the alternating current perturbation has an amplitude between about 0.3 V and 0.7 V.

11. The method of claim 1, wherein the alternating current source is voltage controlled, and the alternating current perturbation has an amplitude of about 0.5 V.

12. The method of claim 1, wherein the treatment time is between about 1 minute and 5 hours.

13. The method of claim 1, wherein the treatment time is between about 1 minute and 1 hour.

14. The method of claim 1, wherein the treatment time is about 2 minutes.

15. The method of claim 1, wherein the alternating current perturbation has a current density amplitude between about 0.05 $mA/cm^2$ and about 20 $mA/cm^2$.

16. The method of claim 1, further comprising pretreating the metal electrode with a solvent before subjecting the electrochemical cell to the alternating current perturbation.

17. The method of claim 16, wherein the solvent comprises an alkane.

18. A method for making an electrochemical cell, the method comprising:
(a) assembling a metal electrode into a full electrochemical cell, wherein the metal electrode comprises one of an anode or a cathode of the electrochemical cell;
(b) connecting the electrochemical cell to a voltage controlled alternating current source; and
(c) subjecting the electrochemical cell to an alternating current perturbation for a treatment time, wherein the alternating current perturbation is isolated to just one of the anode and the cathode of the electrochemical cell, wherein the metal electrode comprises a metal selected from the group consisting of lithium, magnesium, sodium, and zinc.

19. The method of claim 18 wherein:
upon cycling of the electrochemical cell, dendrites on the one of the anode and the cathode are smaller and more uniform compared to a similar electrochemical cell in which a metal electrode of the similar electrochemical cell was not subjected to an alternating current perturbation.

20. The method of claim 18, wherein step (c) is initiated before or after a solid electrolyte interphase is present on the one of the anode and the cathode.

21. The method of claim 18, wherein step (c) comprises a first charge of the electrochemical cell.

22. The method of claim 18, wherein step (c) comprises applying the alternating current perturbation after a discharge of the cell.

23. The method of claim 18, wherein step (c) comprises applying a one-time alternating current perturbation.

24. The method of claim 18, wherein step (c) comprises applying the alternating current perturbation after every charge/discharge cycle of the cell.

25. The method of claim 18, wherein step (c) comprises applying the alternating current perturbation to the electrochemical cell for a treatment time without a simultaneous or switching application of a direct current.

26. The method of claim 18, wherein the alternating current perturbation has a voltage amplitude less than a full discharge voltage of the electrochemical cell thereby treating the one of the anode and the cathode.

27. The method of claim 18, wherein the alternating current perturbation has an amplitude between about 0.05 V and 1.0 V.

28. The method of claim 18, wherein the alternating current perturbation has an amplitude between about 0.3 V and 0.7 V.

29. The method of claim 18, wherein the alternating current perturbation has an amplitude of about 0.5 V.

30. The method of claim 18, wherein the treatment time is between about 1 minute and 5 hours.

31. The method of claim 18, wherein the treatment time is between about 1 minute and 1 hour.

32. The method of claim 18, wherein the alternating current perturbation has a current density amplitude between about 0.05 $mA/cm^2$ and about 20 $mA/cm^2$.

33. The method of claim 18, wherein the treated metal electrode is an anode of the electrochemical cell.

34. The method of claim 18, wherein the treated metal electrode is a cathode of the electrochemical cell.

35. The method of claim 18, wherein the electrochemical cell includes a lithium metal anode and a cathode comprising a lithium host material.

36. The method of claim 35, wherein the lithium host material is selected from lithium metal oxides wherein the metal is one or more of aluminum, cobalt, iron, manganese, nickel, vanadium, lithium-containing phosphates having a general formula $LiMPO_4$ wherein M is one or more of cobalt, iron, manganese, and nickel.

37. The method of claim 36, wherein the lithium host material is selected from lithium cobalt oxide, lithium nickel manganese cobalt oxide, and lithium manganese oxide.

38. The method of claim 18, wherein the electrochemical cell includes a lithium metal anode and a cathode comprising sulfur.

39. The method of claim 18, wherein the electrochemical cell includes a lithium metal anode and a cathode comprising an air electrode.

40. The method of claim 18, wherein the electrochemical cell includes a liquid electrolyte.

41. The method of claim 40, wherein the liquid electrolyte comprises a lithium compound in an organic solvent.

42. The method of claim 41, wherein the lithium compound is selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf).

43. The method of claim 41, wherein the organic solvent is selected from carbonate based solvents, ether based solvents, ionic liquids, and mixtures thereof.

44. The method of claim 43 wherein:
the carbonate based solvent is selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and
the ether based solvent is selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

45. The method of claim 18, wherein the electrochemical cell includes a solid electrolyte material.

46. The method of claim 45, wherein the solid electrolyte material comprises a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

47. The method of claim 39, wherein the liquid electrolyte comprises a magnesium compound in an organic solvent.

48. The method of claim 47, wherein the electrochemical cell includes a magnesium metal anode.

49. A method for making an electrochemical cell, the method comprising:
(a) assembling a metal electrode into a full electrochemical cell wherein the metal electrode comprises an anode or a cathode of the electrochemical cell;
(b) connecting the electrochemical cell to a current controlled alternating current source; and
(c) subjecting the electrochemical cell to an alternating current perturbation for a treatment time,
wherein the metal electrode comprises a metal selected from the group consisting of lithium, magnesium, sodium, and zinc, and
wherein the alternating current perturbation is isolated to just one of the anode and the cathode of the electrochemical cell.

50. The method of claim 49 wherein:
upon cycling of the electrochemical cell, dendrites on the one of the anode and the cathode are smaller and more uniform compared to a similar electrochemical cell in which a metal electrode of the similar electrochemical cell was not subjected to an alternating current perturbation.

51. The method of claim 49, wherein step (c) comprises treating the anode.

52. The method of claim 49, wherein step (c) is initiated before or after a solid electrolyte interphase is present on the anode.

53. The method of claim 49, wherein step (c) comprises a first charge of the electrochemical cell.

54. The method of claim 49, wherein step (c) comprises applying the alternating current perturbation after a discharge of the cell.

55. The method of claim 49, wherein step (c) comprises applying a one-time alternating current perturbation.

56. The method of claim 49, wherein step (c) comprises applying the alternating current perturbation after every charge/discharge cycle of the cell.

57. The method of claim 49, wherein step (c) comprises applying the alternating current perturbation to the electrochemical cell for a treatment time without a simultaneous or switching application of a direct current.

58. The method of claim 49, wherein the alternating current perturbation has an amplitude between about 0.05 V and 1.0 V.

59. The method of claim 49, wherein the alternating current perturbation has an amplitude between about 0.3 V and 0.7 V.

60. The method of claim 49, wherein the alternating current perturbation has an amplitude of about 0.5 V.

61. The method of claim 49, wherein the treatment time is between about 1 minute and 5 hours.

62. The method of claim 49, wherein the treatment time is between about 1 minute and 1 hour.

63. The method of claim 49, wherein the alternating current perturbation has a current density amplitude between about 0.05 $mA/cm^2$ and about 20 $mA/cm^2$.

64. The method of claim 49, wherein the electrochemical cell includes a lithium metal anode and a cathode comprising a lithium host material.

65. The method of claim 64, wherein the lithium host material is selected from lithium metal oxides wherein the metal is one or more of aluminum, cobalt, iron, manganese, nickel, vanadium, lithium-containing phosphates having a general formula $LiMPO_4$ wherein M is one or more of cobalt, iron, manganese, and nickel.

66. The method of claim 64, wherein the lithium host material is selected from lithium cobalt oxide, lithium nickel manganese cobalt oxide, and lithium manganese oxide.

67. The method of claim 49, wherein the electrochemical cell includes a lithium metal anode and a cathode comprising sulfur.

68. The method of claim 49, wherein the electrochemical cell includes a lithium metal anode and a cathode comprising an air electrode.

69. The method of claim 49, wherein the electrochemical cell includes a liquid electrolyte.

70. The method of claim 69, wherein the liquid electrolyte comprises a lithium compound in an organic solvent.

71. The method of claim 70, wherein the lithium compound is selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf).

72. The method of claim 70, wherein the organic solvent is selected from carbonate based solvents, ether based solvents, ionic liquids, and mixtures thereof.

73. The method of claim 72 wherein:
the carbonate based solvent is selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and
the ether based solvent is selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

74. The method of claim 49, wherein the electrochemical cell includes a solid electrolyte material.

75. The method of claim 74, wherein the solid electrolyte material comprises a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

76. The method of claim 69, wherein the liquid electrolyte comprises a magnesium compound in an organic solvent.

77. The method of claim 76, wherein the electrochemical cell includes a magnesium metal anode.

\* \* \* \* \*